(12) United States Patent
Farrer

(10) Patent No.: US 12,265,699 B2
(45) Date of Patent: Apr. 1, 2025

(54) CENTRAL CONTROL HUB FOR ENTERTAINMENT SYSTEM

(71) Applicant: Red Weather Systems Inc., Costa Mesa, CA (US)

(72) Inventor: Trent Farrer, Vancouver, WA (US)

(73) Assignee: RED WEATHER SYSTEMS INC., Costa Mesa, CA (US)

( * ) Notice: Subject to any disclaimer, the term of this patent is extended or adjusted under 35 U.S.C. 154(b) by 0 days.

(21) Appl. No.: 18/340,312

(22) Filed: Jun. 23, 2023

(65) Prior Publication Data

US 2023/0418457 A1   Dec. 28, 2023

Related U.S. Application Data

(60) Provisional application No. 63/367,014, filed on Jun. 24, 2022.

(51) Int. Cl.
| | | |
|---|---|---|
| *G06F 3/048* | (2013.01) | |
| *G06F 3/04847* | (2022.01) | |
| *G06F 3/14* | (2006.01) | |
| *G06F 3/16* | (2006.01) | |

(52) U.S. Cl.
CPC ............ *G06F 3/04847* (2013.01); *G06F 3/14* (2013.01); *G06F 3/165* (2013.01); *G06F 3/167* (2013.01)

(58) Field of Classification Search
CPC ........ G06F 3/04847; G06F 3/14; G06F 3/165; G06F 3/167
See application file for complete search history.

(56) References Cited

U.S. PATENT DOCUMENTS

| | | | | |
|---|---|---|---|---|
| 4,328,049 | A * | 5/1982 | Richardson | B23K 7/102 |
| | | | | 148/195 |
| 6,413,079 | B1 * | 7/2002 | Lyons | G10L 15/26 |
| | | | | 704/E15.045 |
| 8,823,714 | B1 * | 9/2014 | Thielvoldt | F24B 1/191 |
| | | | | 704/200 |
| 10,075,828 | B2 * | 9/2018 | Horton | H04L 12/2823 |
| 10,142,122 | B1 * | 11/2018 | Hill | H04L 12/2807 |
| 10,746,407 | B1 * | 8/2020 | Mann | G06F 3/16 |
| 10,842,146 | B1 * | 11/2020 | Pannullo | F21V 37/002 |
| 11,173,854 | B1 * | 11/2021 | Jordan | B63B 34/26 |
| 2002/0166554 | A1 * | 11/2002 | Berg | F24B 1/1808 |
| | | | | 40/428 |

(Continued)

OTHER PUBLICATIONS

Schaffert et al., Interactive Sonification in Rowing: Acoustic Feedback for On-Water Training, 2015, IEEE, 10 pages (Year: 2015).*

*Primary Examiner* — Linh K Pham
(74) *Attorney, Agent, or Firm* — McCoy Russell LLP

(57) ABSTRACT

Methods and systems are provided for an entertainment system. In one example, a method for operating an entertainment system includes receiving user input at a central control hub communicatively coupled to one or more display devices and converting the instructions into one or more signal transmission modes at the central control hub. The one or more signal transmission modes may correspond to communication modes of the one or more display devices, allowing the instructions to be delivered to the one or more display devices from the central control hub to present the instructions as a visual and/or audio display to an audience.

15 Claims, 11 Drawing Sheets

(56) References Cited

U.S. PATENT DOCUMENTS

| | | | |
|---|---|---|---|
| 2005/0208443 A1* | 9/2005 | Bachinski | F23N 5/00 |
| | | | 126/512 |
| 2009/0066534 A1* | 3/2009 | Sivakkolundhu | H04L 12/281 |
| | | | 340/4.32 |
| 2011/0080261 A1* | 4/2011 | Asofsky | F24C 7/087 |
| | | | 340/815.45 |
| 2012/0048841 A1* | 3/2012 | Asofsky | F24C 7/004 |
| | | | 219/201 |
| 2013/0221585 A1* | 8/2013 | Bissonnette | B23K 7/10 |
| | | | 266/44 |
| 2014/0265935 A1* | 9/2014 | Sadwick | H05B 45/56 |
| | | | 315/307 |
| 2016/0261425 A1* | 9/2016 | Horton | H04L 12/2803 |
| 2017/0181250 A1* | 6/2017 | Won | H04S 7/40 |
| 2017/0242557 A1* | 8/2017 | Rotschield | H04L 41/22 |
| 2018/0192621 A1* | 7/2018 | Valatka | A01K 1/00 |
| 2019/0179610 A1* | 6/2019 | Aiken | H04L 12/282 |
| 2019/0285274 A1* | 9/2019 | Chen | F23N 1/002 |
| 2019/0394863 A1* | 12/2019 | Elliot | H05B 47/19 |
| 2020/0280756 A1* | 9/2020 | Vurimi | H04N 21/42203 |
| 2020/0401366 A1* | 12/2020 | Beaumier | G06F 3/04847 |
| 2020/0412566 A1* | 12/2020 | Mo | H04L 12/2816 |
| 2021/0318847 A1* | 10/2021 | Sullivan | G10L 25/51 |
| 2021/0329165 A1* | 10/2021 | Liu | G06F 21/6245 |
| 2022/0103395 A1 | 3/2022 | Shi et al. | |
| 2022/0156033 A1* | 5/2022 | Liu | G10L 25/51 |
| 2022/0264207 A1 | 8/2022 | Farrer | |

* cited by examiner

CENTRAL CONTROL HUB FOR ENTERTAINMENT SYSTEM

CROSS-REFERENCE TO RELATED APPLICATIONS

The present application claims priority to U.S. Provisional Application No. 63/367,014, entitled "CENTRAL CONTROL HUB FOR ENTERTAINMENT SYSTEM", and filed on Jun. 24, 2022. The entire contents of the above-listed application are hereby incorporated by reference for all purposes.

FIELD

The present description relates generally to methods and systems for an audio/visual entertainment system. The entertainment system may include displays such as fire devices, water features, lighting, where the displays may be synchronized to music. Control of audio/visual aspects of the displays may be provided by a single, central hub.

BACKGROUND/SUMMARY

Entertainment systems may include a variety of display devices with audio and/or visual capabilities. In one example, an entertainment system may be used to generate a desired atmosphere for an outdoor environment, such as a backyard. For example, during sporting events, social gatherings, holiday parties, etc., the entertainment system may provide visual performances via lighting, fire, and/or water displays, which may be synchronized to music. The entertainment system may therefore enhance aesthetic and sensory enjoyment of the outdoor environment.

When one or more types of display devices are implemented in the entertainment system, each type of display device may have its own control system for enabling adjustments to its display parameters. In addition, each type of display device may be associated with a specific signal mode and a specific transmitter/receiver for device control, via hard-wired or wireless communication. Furthermore, coordinated adjustment of the parameters of the different types of display devices to, for example, correspond to an audio signal may be challenging when each type of display device is controlled according to a different communication mode.

In one example, the issues described above may be at least partially addressed by a method for operating an entertainment system, the method comprising receiving user input at a central control hub communicatively coupled to one or more display devices, the user input including instructions for adjusting operating parameters of the one or more display devices of the entertainment system, the one or more display devices including one or more of speakers, fire devices, lighting devices, and water feature devices. The central control hub may be a mobile device or other personal computing device, in one or more examples. The method further includes converting the instructions into one or more signal transmission modes at the central control hub, the one or more signal transmission modes corresponding to communication modes of the one or more display devices. The instructions may be delivered to the one or more display devices from the central control hub via the communication modes of the one or more display devices to output a display at the one or more display devices, the display including visual and/or audio displays, based on the instruction.

For example, the one or more display devices of the entertainment system may be controlled in a unified manner based on a capability of the central control hub for receiving and transmitting signals via different communication modes or protocols. The central control hub may be configured to facilitate coordinated operation of the display devices according to the user input, which may be received via one or more input modes. Additionally, the central control hub may communicate with a database to deliver pre-set instructions for operating the display devices, thereby providing flexibility with respect to how much user input is demanded, as desired by a user It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
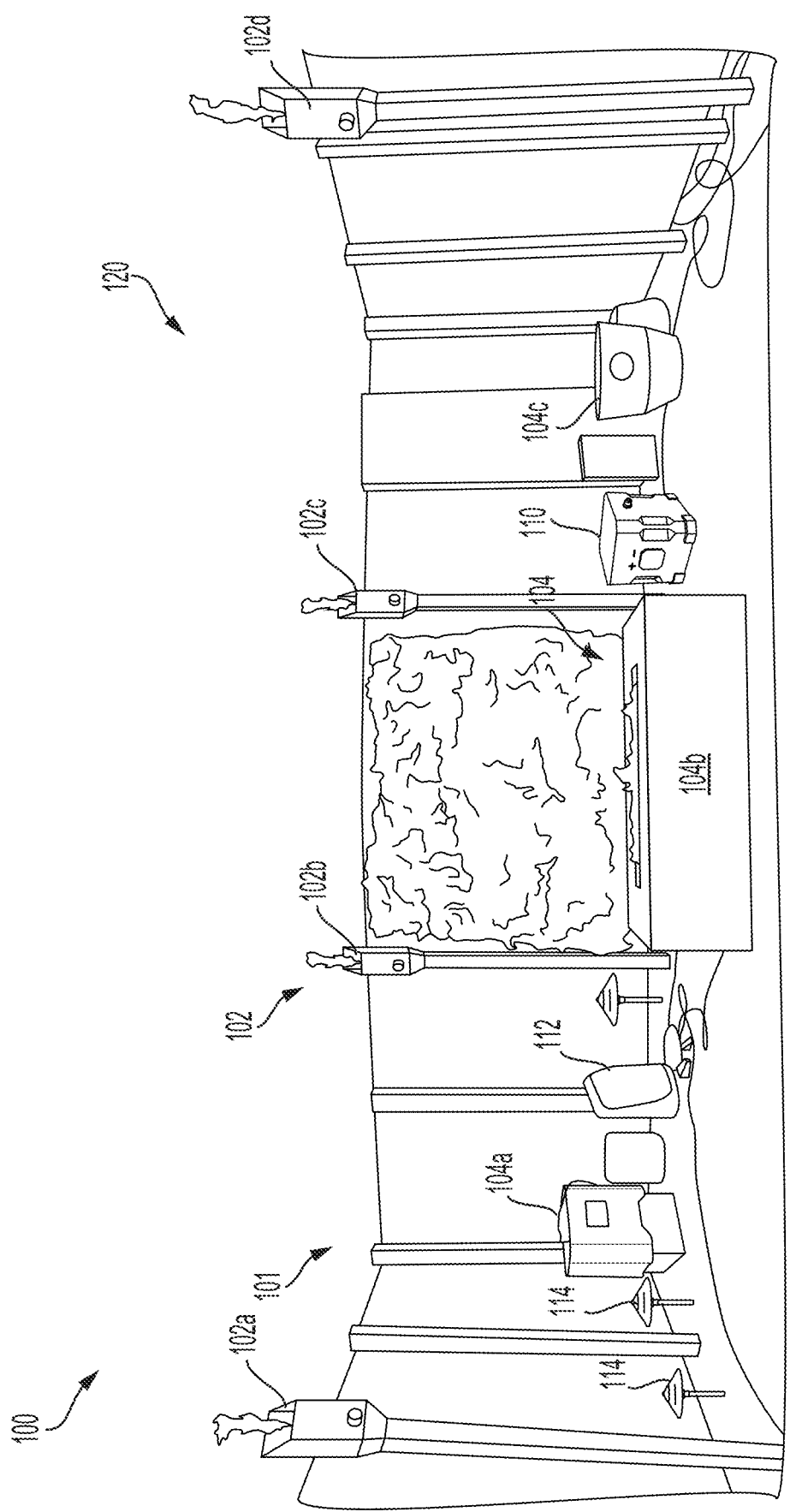
FIG. 1 shows an example of an environment in which an entertainment system may be located and operated, the entertainment system including a central control hub.
Figure 2:
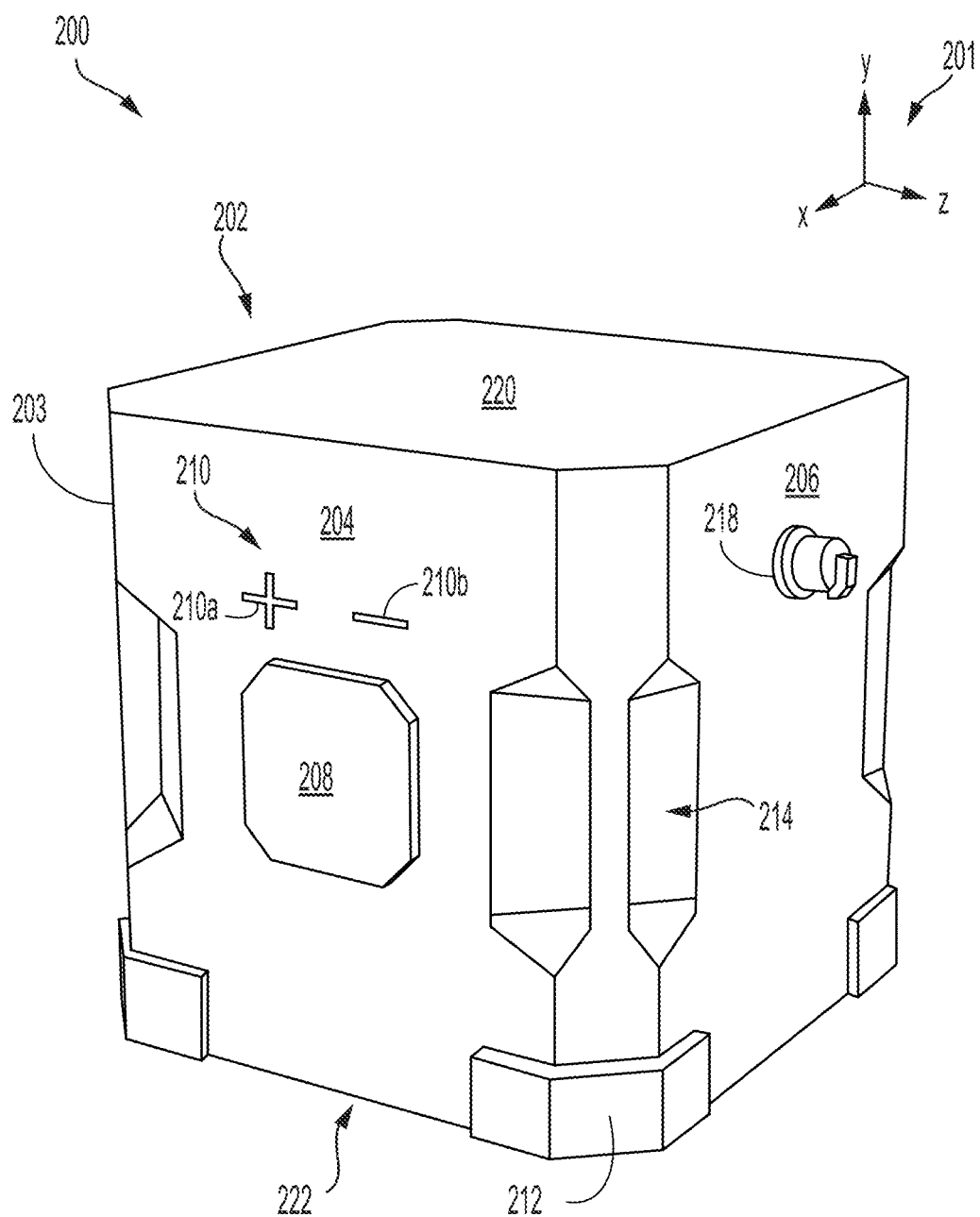
FIG. 2 shows a first view of a first exemplary embodiment of a central control hub.
Figure 3:
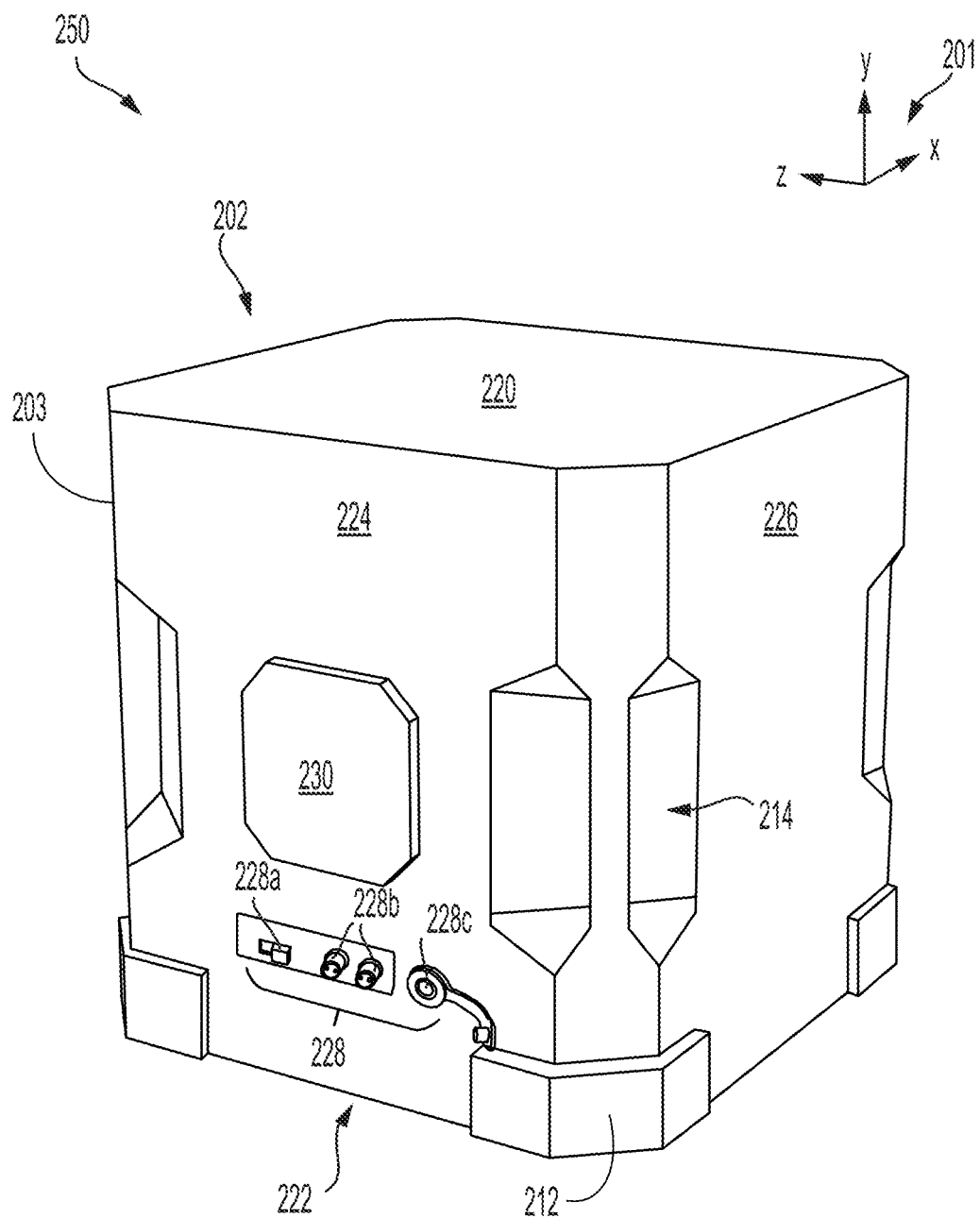
FIG. 3 shows a second view of the central control hub of FIG. 2.
Figure 8:
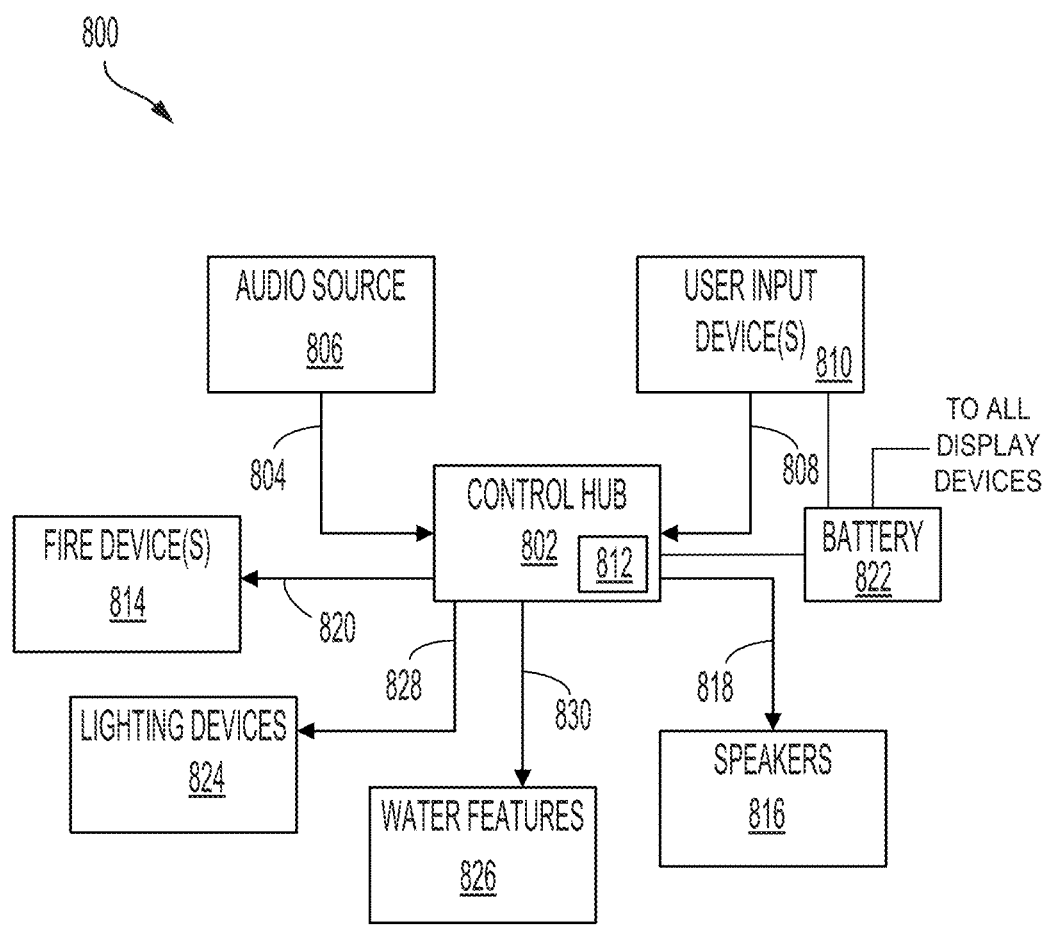
FIG. 8 shows a diagram depicting signal flow in a network of the entertainment system.
Figure 9:
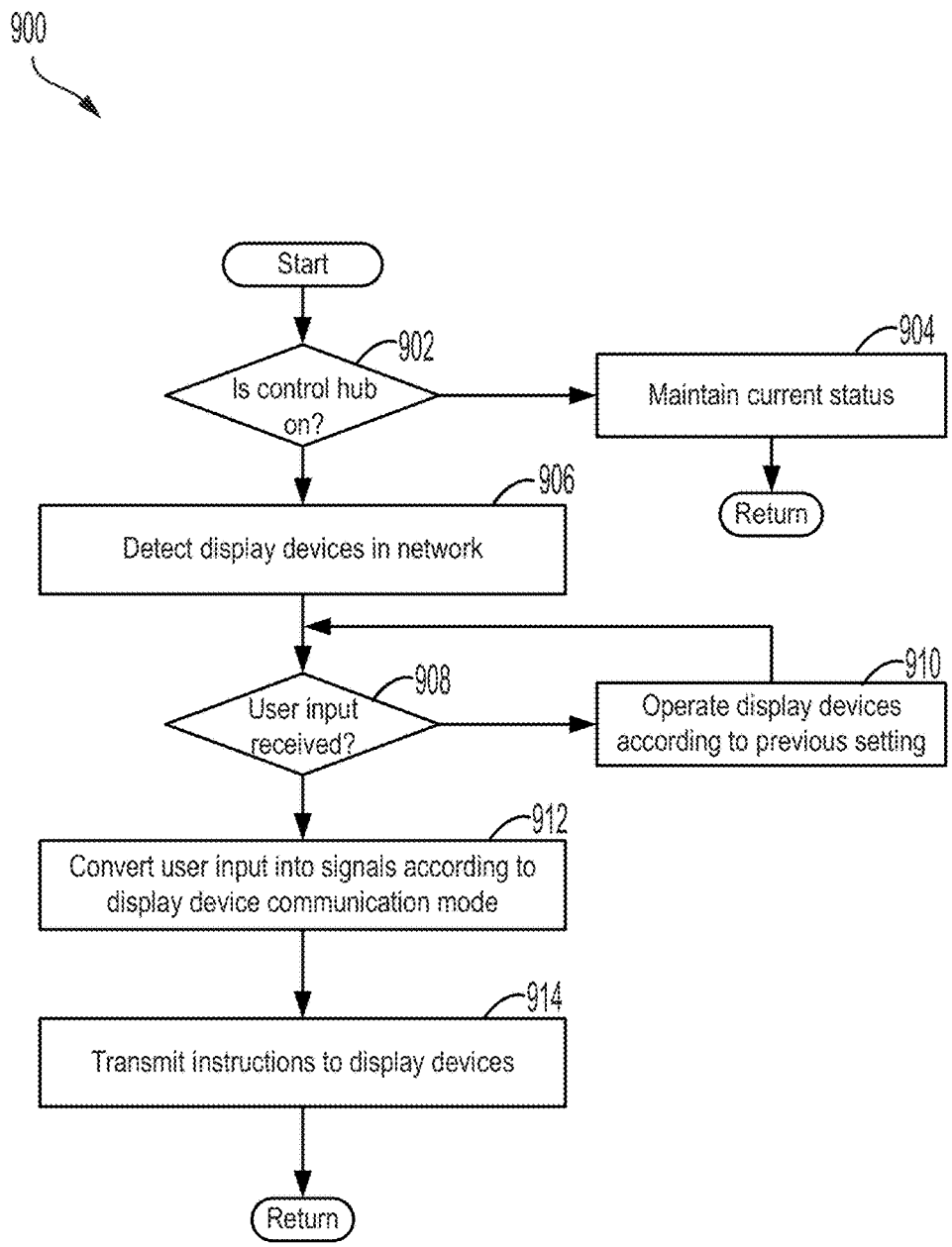
FIG. 9 shows an example of a method for operating the entertainment system.
Figure 10:
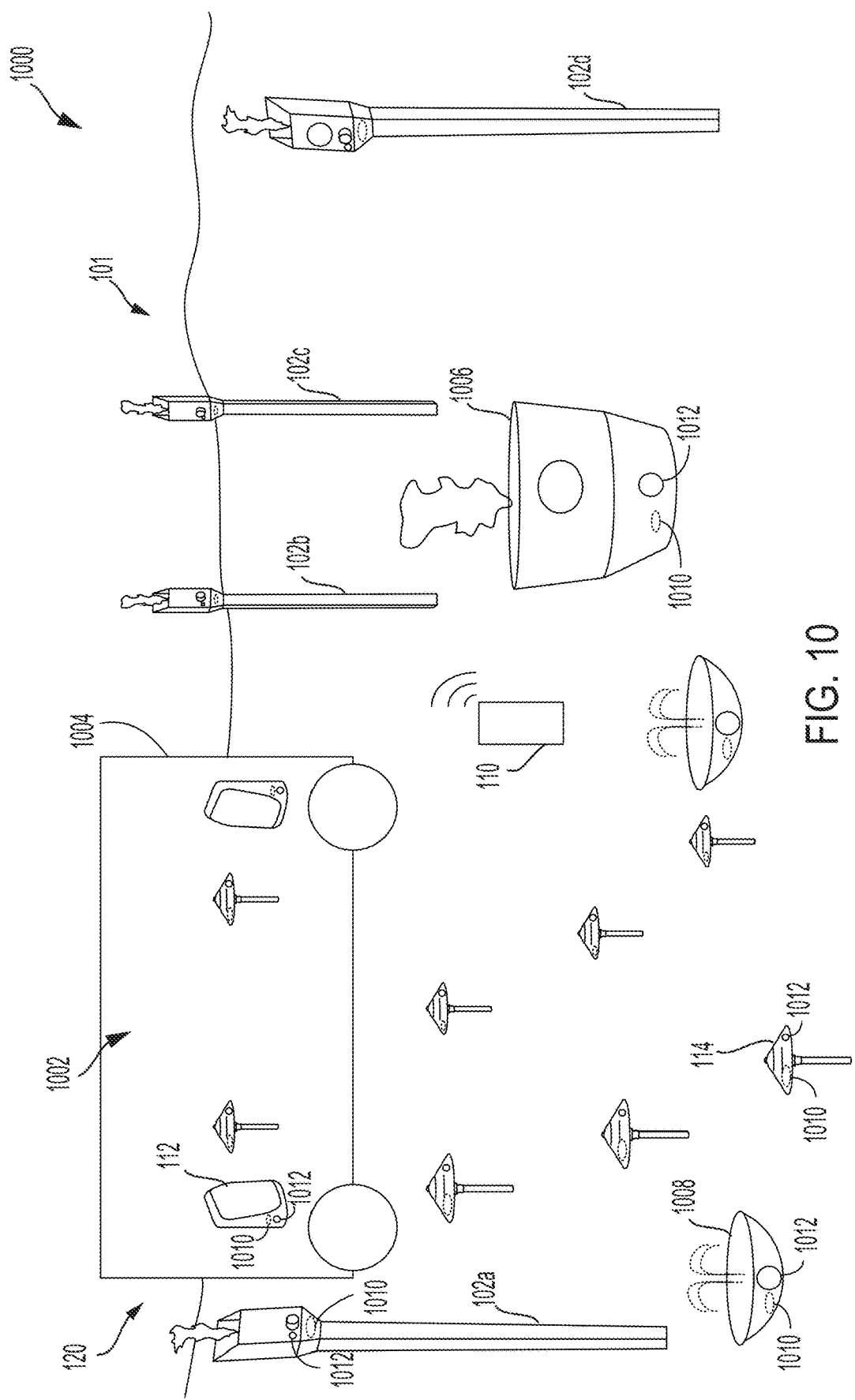
FIG. 10 shows a second example environment in which an entertainment system may be located and operated, the entertainment system including a central control hub.
Figure 11:
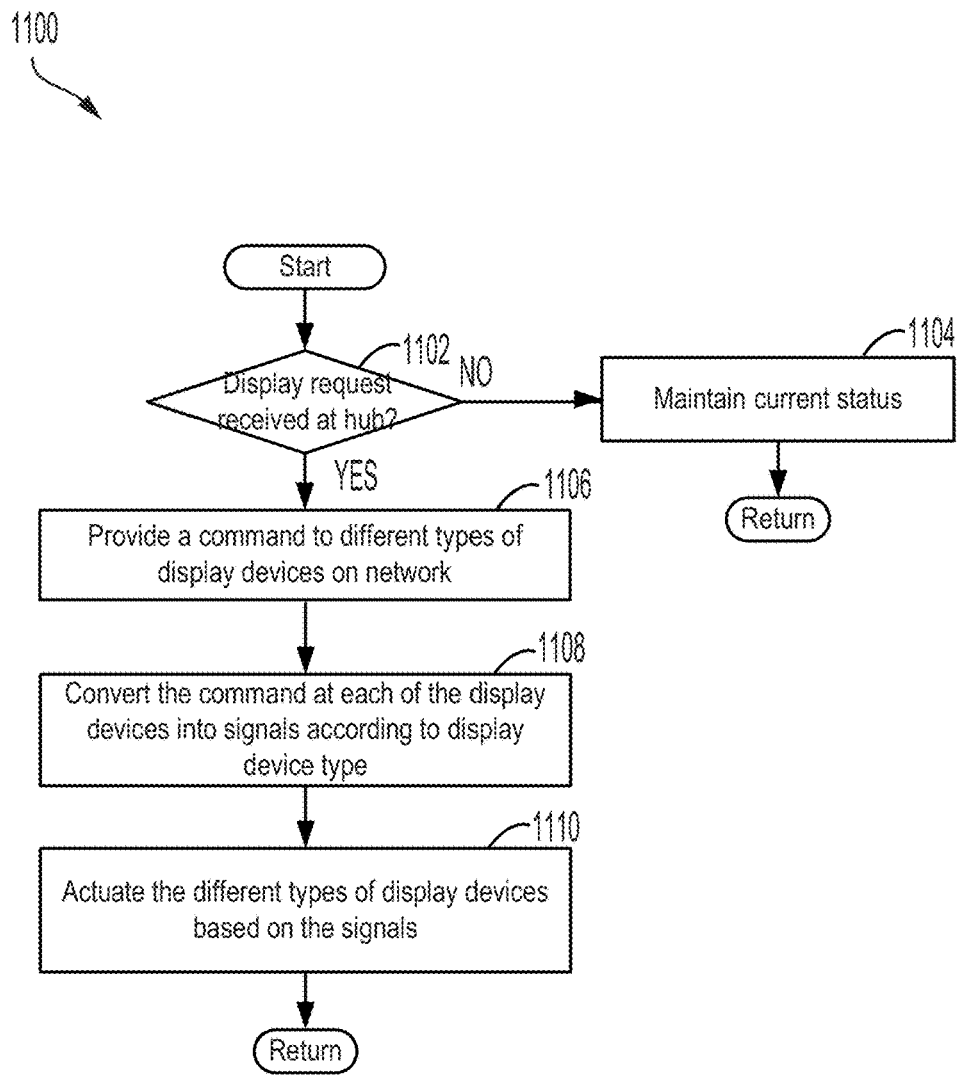
FIG. 11 shows a second example method for operating the entertainment system.

The following description relates to systems and methods for an entertainment system. The entertainment system may include one or more display devices providing visual and/or audio presentations. The display devices may be included in a network of the entertainment system, which may be installed in a variety of environments. For example, the entertainment system may be displayed in indoor settings, such as a warehouse, as shown in FIG. 1, as well as outdoor settings, such as backyards, courtyards, etc. In some examples, the entertainment system may be displayed in a system environment that includes both indoor and outdoor components, such as shown in FIG. 10. In order to provide efficient, concerted control of the network of display devices, a central control hub may be implemented in the entertainment system. A first example of the central control hub is shown in FIGS. 2-3, and additional examples of the central control hub are depicted in FIGS. 4-7. A diagram is shown in FIG. 8, illustrating transmission of signals between components of the network of the entertainment system, where the network includes different types of display devices as well as the central control hub. Operation of the entertainment system is depicted in FIGS. 9 and 11, in example methods for controlling operating parameters of the devices.

Turning first to FIG. 1, it shows a system environment 100, according to one or more examples of the present disclosure. The system environment 100 is the environment in which devices of the present disclosure on a same network are located.

The system environment 100 in FIG. 1 is depicted as an indoor environment, in particular a large warehouse space. Indoor environments for the system environment 100 may additionally or alternatively include one or more of inside a residential building, inside a commercial building, inside a recreational vehicle (RV), inside a tent, and inside a cabin of a boat, for example. It is noted that other indoor environments may be possible without departing from the scope of the present disclosure. In other examples, the system environment 100 may instead be an outdoor environment, such as a backyard, a campsite, on deck of a boat, or on a body of water such as a lake or ocean, for example. In at least one example, the system environment 100 may comprise one or more indoor environments and one or more outdoor environments. For example, the system environment 100 may include the indoor environment of inside an RV as well as the outdoor environment of a campsite (such as shown at FIG. 10). As another example, the system environment 100 may include the indoor environment of inside a residential building (e.g., a house), as well as the outdoor environment of a backyard. In a further example, the system environment 100 may include the indoor environment of inside a tent, as well as the outdoor environment of on deck of a boat and on a lake. In such examples where the system environment 100 includes on a lake, at least one device in the network is positioned on the lake, such as a speaker with its own flotation configuration.

The system environment 100 includes a network 101 of visual and audio display devices which may be included in an entertainment system 120. As discussed in further detail at FIG. 10, each of the devices in the network 101 may comprise a network-based controller and a connect mode input. The connect mode input may be a connect mode button, dial, or other user input provided on each of the visual and audio display devices of the entertainment system 120 to initiate connection of the devices to the network 101.

In one example, as shown in FIG. 1, the entertainment system 120 may include fire devices as visual display devices, the fire devices including a plurality of torches 102a, 102b, 102c, 102d (also referred to as torches 102). Though there are four torches (e.g., fire torches) shown in the example at FIG. 1, it is noted that additional torches or fewer torches may be included in the system without departing from the scope of the disclosure. One or more of the torches 102 may be fire only devices, in at least one example. That is, one or more of the torches 102 may provide a fire display without providing an audio output. It is further noted that one or more of the torches 102 may provide both a fire display and an audio output, in at least one example. In such examples, the one or more fire pits 104 providing the audio output may be considered combination audio and visual display devices.

Furthermore, while the network 101 is composed of fire devices in FIG. 1, other examples may include various other types of display devices in addition to or in place of the fire devices such that the network 101 is incorporated into a multi-media entertainment system. Other visual display devices of the network 101 shown in FIG. 1 include lighting devices 114, which may illuminate a region within a threshold radius of each of the lighting devices 114. The lighting devices 114 may be strategically positioned to provide maximum illumination of the system environment 100 or targeted lighting of specific areas of the system environment 100. The network 101 may additionally or alternatively include other types of visual display devices, such as water features, etc., which may be operated and controlled in a similar manner in the network 101 as described herein. The types of visual display devices may be incorporated in the network 101 in various combinations and quantities according to a user's preference.

In addition to the torches 102, the system environment 100 includes other fire devices such as a first fire pit 104a, a second fire pit 104b, and a third fire pit 104c (also referred to as fire pits 104). As with the torches 102, there may be additional fire pits or fewer fire pits included in the system, in at least one example. The torches 102 and the fire pits 104 together may form a fire display controlled by a hub 110 (e.g., a central control hub 110). One or more of the fire pits 104 may comprise a speaker for providing an audio output.

The hub 110 is a controller having a processor with instructions stored in non-transitory memory that, when executed, sends control signals to control one or more of the torches 102 and the fire pits 104. For example, the control signals sent from the hub 110 may be received at controllers of the respective torches 102 and fire pits 104. Responsive to receiving the control signals from the hub 110, the controllers of the torches 102 and fire pits 104 may then actuate at least one of an electric valve and an ignitor of the respective torch and fire pit, where the electric valve controls an amount of fuel flow to a burner of the fire device where the ignitor is positioned. Via such actuation, a flame size and height may be controlled for the torches 102 and fire pits 104.

Figure 4:
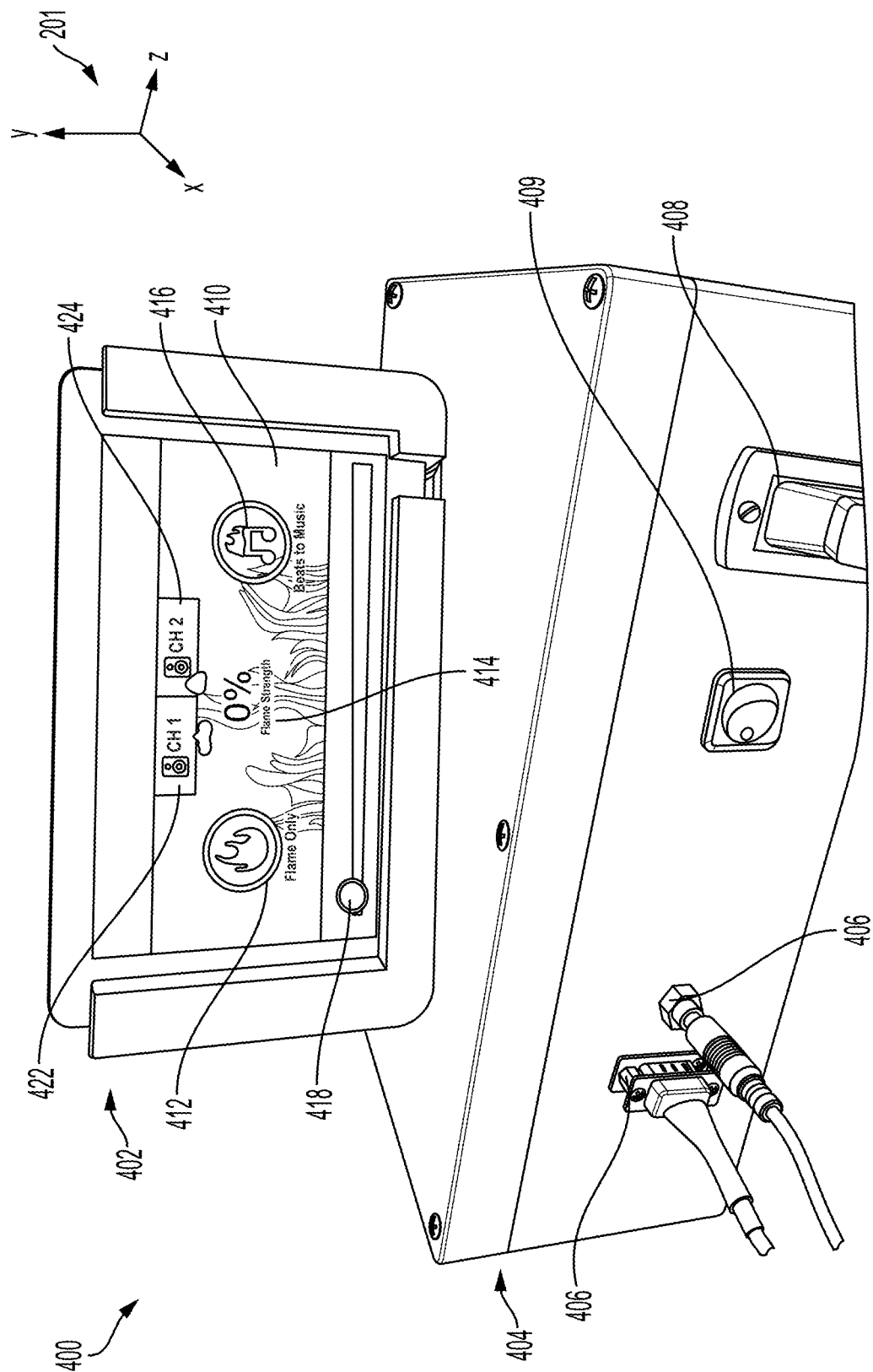
FIG. 4 shows a second exemplary embodiment of a central control hub.

The control signals are sent from the hub 110 to one or more of the torches 102 in response to the processor of the hub 110 receiving input signals. The control signals may further be sent from the hub 110 to one or more of the fire pits 104 responsive to such input signals. In at least one example, the processor of the hub 110 receives input signals via one or more of a wireless receiver of the hub 110, a hardwired connection of the hub 110, and a user interface integrated into the hub 110 itself, where the user interface comprises one or more user input devices (e.g., buttons, dials, a touch screen) to receive the input signal. In examples where the hub 110 receives input signals via a wireless receiver, it is noted that the input signals may be received from a mobile device or other personal computing device communicatively coupled to the hub 110 via the wireless receiver. Further, in some examples and as shown in FIG. 4, the personal computing device may include a user interface with remote capabilities that can be used by the user to enter control commands at a distance from the entertainment system 120.

The input signals received at the hub 110 may include a mode selection received at the hub 110. For example, the mode selection may include selection, e.g., user selection, of a traditional mode or an audio mode. In the traditional mode, the torches 102 and fire pits 104 are operated with their respective electric valves maintained at a predetermined base position. At the base position, the electric valves of the torches 102 and the fire pits 104 are at least partially open and allow a predetermined amount of fuel to flow to their respective burners. If the electric valve of any of the torches 102 and fire pits 104 being controlled in the traditional mode is not at the base position when the traditional mode is selected, then the electric valve is first adjusted to the predetermined base position and maintained in the base position for a duration of the traditional mode. Due to the maintained position of the electric valve, a steady flame size and height is maintained in the traditional mode.

In the audio mode, the torches 102 and fire pits 104 are operated with their respective electric valves being varied in coordination to an audio input, such as music. The audio input may be selected by the user and indicated to the hub 110, e.g., via manual input, or may be provided as a pre-set audio program. As such, the network may also include at least one audio display device, such as a speaker 112, as depicted in FIG. 1.

The speaker 112 may similarly be controlled by the hub 110, which may transmit signals to the speaker based on the audio input to modulate audio parameters of the speaker 112. In some examples, audio and visual capabilities may be integrated into a single device. For example, a fire pit may be configured with a speaker, or the fire pit may include both the speaker and lighting elements, allowing one or more of a fire, music, and light display to be presented at a common device. In some examples, as shown in FIGS. 2-3, a speaker may be integrated into the hub 110, thereby allowing the hub 110 to convert the audio input into sound. The speaker 112, when communicatively coupled to the hub 110, may therefore provide accompaniment and/or amplification of the sound delivered by the hub 110 or may broadcast the audio input instead of the hub 110. Thus, responsive to receiving a user input selecting the audio torch mode and further receiving the audio input, the hub 110 may send control signals to the torches 102 and fire pits 104 based on the audio input.

In particular, the hub 110 may send control signals to adjust respective electric valves of the torches 102 and the fire pits 104 in coordination with the audio input. It is noted that the audio input may be received at the hub 110 via a wireless or a wired connection. For example, the audio input may be received at the hub 110 via wirelessly streaming the audio input to the hub 110 via a mobile device or other personal computing device. In such examples, a wireless receiver of the hub 110 may receive the audio input. As another example, the audio input may be received at the hub 110 via an auxiliary (herein, aux) input or other wired audio input. In such examples, a mobile device or other personal computing device may provide the audio input to the hub 110 via such an aux input or other wired audio input.

The electric valve may be adjusted to positions more open than the base position of the traditional mode while in the audio mode, based on the audio input. Fuel flow may thereby be greater through the fire devices when operating in the audio mode versus in the traditional mode. Additionally, the electric valve may be adjusted to positions that are less open than the base position of the traditional mode while in the audio mode, based on the audio input. In this way, flame bursts and decreases in flame size may be created for the flame display. Thus, in contrast to the traditional mode, the torches 102 and fire pits 104 produce flame sizes and heights that are varied throughout the audio mode in coordination with the audio input.

In at least one example, a flame boost mode is further available, in which a maximum fuel flow is provided to a burner. In some examples, the flame boost mode may be used for purposes of heating an accessory, such as a griddle or grill attachment. The flame boost mode may also be used for purposes of producing a maximum flame height and size, which may be of interest for lighting or theatrical effect, for example. In the flame boost mode, the electric valve of the torches 102 or fire pits 104 is actuated to a wide open position, e.g., a more open position than the base position. In at least one example, the flame boost mode may further require a mechanical valve to be manually adjusted to a wide open position, in addition to the electric valve being adjusted to the wide open position.

In examples where the flame boost mode is available, it is noted that the wide open position of the electric valve is more open than the base position for the traditional mode. That is, in examples where the flame devices include the flame boost mode, the flame boost mode creates a maximum flame height and size, which is larger than the flame height and size when operating in the traditional mode.

In at least one example, hub 110 allows for there to be separate control of the torches 102 and the fire pits 104. In separate control examples, it is noted that the mode selections for each of the fire pits 104 and the torches 102 may be made individually set. Thus, each of the torches 102 and each of the fire pits 104 is able to have its own mode selected and individually controlled via the hub 110.

Additionally, or alternatively, the hub 110 may control the torches 102 and the fire pits 104 collectively. In collective control examples, the hub 110 may control the torches 102 and the fire pits 104 all together to be in the same mode. For example, in collective control examples, user selection of the traditional mode may result in all of the torches 102 and the fire pits 104 being set to the traditional mode. Further, in the collective control examples, selection of the audio mode may result in all of the torches 102 and the fire pits 104 being set to the audio mode. As to selection of the flame boost mode, in the collective control examples, selection of the flame boost mode may result in all of the torches 102 and the fire pits 104 being controlled to have their respective electric valves in a wide open position.

Further, the hub 110 may additionally or alternatively control the torches 102 and fire pits 104 in sub-groups. In such sub-group control, sub-groups of the torches 102 and/or the fire pits 104 may be formed for control of the sub-group to be the same. For example, in sub-group control, the hub 110 may control the torches 102 together as an all torches sub-group and may control the fire pits 104 together as an all fire pits sub-group. Thus, in this example, the mode for the all torches sub-group being selected as the traditional mode would result in the torches 102 all being set to the traditional mode. Alternatively, the mode for the all torches sub-group being selected as the audio mode would result in the torches 102 all being set to the audio mode. Similarly, in this example, the mode for the all fire pits sub-group being selected as the traditional mode would result in the fire pits 104 all being set to the traditional mode. Or, alternatively, the mode for the all fire pits sub-group being selected as the audio mode would result in the fire pits 104 all being set to the audio mode.

In another sub-group control example, the hub 110 may control a portion of the torches 102 as a first torch sub-group, another portion of the torches 102 as second torch sub-group, a portion of the fire pits 104 as a first fire pit sub-group, and another portion of the fire pits 104 as a second fire pit sub-group. Moreover, a sub-group may contain both torches 102 and fire pits 104, in at least one example.

It is noted that if selection of any of the traditional mode, audio mode, and flame boost mode is also determined to initiate ignition at one or more of the torches 102 and fire pits 104, then the hub 110 may further send a control signal to activate respective ignitors of such torches and fire pits.

The hub 110 may also control the lighting device 114 via similar communication links described herein. For example, the hub 110 may command activation/deactivation of the lighting devices 114 based user input at the hub 110. As another example, an illumination intensity may be adjusted based on instructions transmitted from the hub 110. The lighting devices 114 may also be operated in different modes and sub-groups which may be assigned by the user or pre-set. For example, the lighting devices 114 may be set to a manual mode where the lighting device 114 are turned on/off and/or a brightness varied based on user input. Alternatively, the lighting devices 114, when configured with motion sensors, may be operated in an automatic mode where activation/deactivation and brightness adjustments may be executed based on detection of movement (or lack thereof), as described further below.

Turning now to FIGS. 2 and 3, a first exemplary embodiment of a control hub 202 is shown. A first perspective view 200 of the control hub 202 is illustrated in FIG. 2 and a second perspective view 250 of the control hub 202 is depicted in FIG. 3. A set of reference axes 201 are provided, indicating a y-axis, an x-axis, and a z-axis. In one example, the y-axis may be a vertical axis, oriented parallel with a direction of gravity. The control hub 202 shown in FIGS. 2-3 may be configured with any one or more control hub features described herein, such as in relation to control hub 202. In at least one example, the control hub 202 may correspond to the hub 110 shown in FIG. 1.

As shown in FIGS. 2-3, the control hub 202 has a housing 203 with a substantially rounded cuboid shape, though other shapes are possible without departing from the scope of the disclosure. Further, though various dimensions are possible, in at least one example the control hub 202 may have a rounded cube shape with approximately 13"×13"×13" dimensions. The housing 203 may be a waterproof housing. In at least one example, the housing 203 of the control hub 202 may include a silicone skin over a plastic shell. Moreover, in one or more examples the housing 203 of the control hub 202 may be at least semi-transparent and include lighting positioned therein to provide a glowing effect for the control hub 202.

The first perspective view 200 of the control hub 202 shows a first side 204 and a second side 206 of the control hub 202, where the second side 206 is adjacent to the first side 204 of the control hub 202. The first side 204 of the control hub 202 includes a speaker 208 and a user input device 210. The user input device 210 may be a volume control including multiple buttons 210a, 210b. For example, button 210a may be a volume increase button and button 210b may be a volume decrease button. The volume increase button 210a may be in the shape of a plus sign, while the volume decrease button 210b may be in the shape of a minus sign, for example, although other shapes and configurations are possible. Thus, via the user input device 210, a volume output via the speaker 208 and any other speakers included in the control hub 202, or communicatively coupled to the control hub 202, may be adjusted. However, it is noted that the control hub 202 may instead include another input receiving means, such as a touch screen or a dial, for example.

The control hub 202 further comprises guards 212, where the guards 212 may help to protect the control hub 202 from degradation. For example, the guards 212 may be formed of a durable, flexible material, such as rubber, to absorb impact or from a more rigid material, such as plastic, to shield corners of the control hub 202. The control hub 202 may further include one or more recessed features 214, which may assist with gripping of the control hub 202 by providing additional edges for increasing traction between a user's hands and the control hub 202.

The second side 206 of the control hub 202 includes a mode user input device 218, which may be used to select a status and operating mode of the control hub 202, according to one or more examples. For example, the mode user input device 218 may be used to turn the control hub 202 on or off, as well as select an operational mode, such as the audio mode or the traditional mode. A top side 220 of the control hub 202 may be substantially flat. Furthermore, though not visible in FIG. 2, a bottom side 222 of the control hub 202 may include one or more feet. The feet may be formed of rubber in at least one example.

Turning to FIG. 3, the second perspective view 250 of the control hub 202 is shown, depicting a third side 224 and a fourth side 226 of the control hub 202. In at least one example, the third side 224 may be positioned opposite the first side 204 of the control hub 202. The fourth side 226 may therefore be positioned between the third side 224 and the first side 204 and opposite the second side 206 of the control hub 202.

As seen in the second perspective view 250, the third side 224 includes a speaker 230 and connectivity mechanisms 228, where the connectivity mechanisms 228 are formed into the third side 224 for coupling display devices to the control hub 202. For example, the connectivity mechanisms 228 may include a toggle switch 228a for electrically connecting and disconnecting the control hub 202 to an electric circuit, communication ports 228b for receiving cables, such as cables communicatively coupling components of an entertainment system (e.g., the entertainment system 120 of FIG. 1), and an audio input port 228c.

Figure 5:
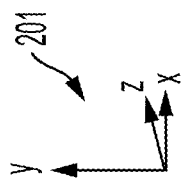
FIG. 5 shows a third exemplary embodiment of a central control hub.
Figure 5:
Figure 5:
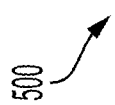

The communication ports 228b may include waterproof connections for receiving the cables. Thus, the communication ports 228b may communicatively couple the control hub 202 to the display devices, so that the control hub 202 is able to provide control signals to the display devices. In other examples (not shown in FIG. 3), the connectivity mechanisms 228 may further include additional types of ports, such as a USB port for charging/connecting a mobile device or other personal computing device, and a charging port for delivering power to the control hub 202 from a power source, such as a power outlet. The additional ports may be located at any of the sides of the control hub 202. A battery (e.g., as shown in FIG. 5) of the control hub 202 may be charged via the charging port when a suitable electrical system, e.g., a cable and converter, are coupled to the charging port. Additionally, the control hub 202 may be directly powered by the power source through the charging port during operation of the control hub 202.

The connectivity mechanisms 228 further includes an audio input port 228c for receiving an audio input. The audio input port 228c may be an aux input, for example, though other possible audio input ports are possible without departing from the scope of this disclosure, in place of or in addition to the audio input port 228c. For example, as detailed at FIG. 5, the audio input may be received wirelessly via a wireless receiver housed inside of the control hub 202 in addition to a hard-wired route via an aux cable coupled to the audio input port 228c.

A second exemplary embodiment of a control hub 400 is shown in FIG. 4. In one example, the control hub 400 may correspond to the hub 110 of FIG. 1, used to control operation and modulation of a network of an entertainment system, such as the network 101 of FIG. 1, the network including the control hub 400 and display devices. As described above, with reference to FIG. 1, the network may be included in the entertainment system to provide both audio and visual entertainment to an audience. The control hub 400 may include a first unit 402 and a second unit 404, where the first unit 402 may be a user interface 402 and the second unit 404 may be a base 404 of the control hub 400.

By dividing the control hub 400 into two units, an overall size of the control hub 400 may be reduced, relative to the control hub 202 of FIGS. 2 and 3. Furthermore, the separation of the control hub 400 into two units, each unit having a different role in relaying signals across the network, allow greater flexibility in a positioning of the control hub 400 within an environmental setting of the entertainment system, as described further below. The user interface 402 may be, for example, a portable computing device configured to receive user input, convert the user input into a transmissible signal that is relayed to the display devices, and receive signals from the display devices to monitor statuses of the display devices. As another example, the user interface 402 may be configured as a remote control device with buttons and dials. The signals may be relayed through the base 404 which may include various components such as electronic devices, processors, transmitters, and receivers for operating the control hub 400. In other words, the base 404 may include hardware and software enabling the base 404 to operate as a controller.

For example, the base 404 may include a box, e.g., a box formed of a rigid, durable material, enclosing the components described above, which may include hardware, such as transmitters and processing units for transmitting signals between the display devices and the user interface 402. The base 404 may include various ports 406 to which cables may be connected to communicatively couple the display devices to the base 404. The base 404 may also include a power port 408 for receiving a power cable. The power cable may deliver power to the base 404 from a power source, such as a power outlet, to enable operation of the base 404. In some examples, the base 404 may also include an internal power source, such as a power storage device (e.g., a battery), which may be charged through the power port 408. When sufficiently charged, the base 404 may be powered by the battery, rather than by the power cable and power outlet.

The base 404 may also include a toggle switch 409 for connecting/disconnecting an electric circuit of the base 404 to and from the power source. Various additional ports and connections may be included at the base, for coupling the base to different types of cables and devices, for hard-wired connection of the user interface 402 to the base 404, etc. For example, the base 404 may include an aux input port for receiving an audio input, such as an aux cable communicatively coupling an audio device such as a mobile phone, a digital music player, etc., to the base 404. Furthermore, the base 404 may include different types of transmitters and receivers, according to communication modes of the display devices, as described below.

In some examples, the base 404 may be enclosed within an aesthetically appealing housing that also buffers impact from contact with external objects. For example, the base 404 may be surrounding by a housing, such as the housing 203 of FIGS. 2 and 3, where the housing may be configured with specific properties, such as waterproofness, flexibility, traction-enhancing texturing, a desired translucency/opacity, patterns and/or logos, etc. The housing may be selected and coupled to the base 404 according to a theme of an event or an overall appearance of an entertainment system (e.g., the entertainment system 120 of FIG. 1). In one example, the housing may match an aesthetic of the display devices, such as an appearance of fire pits, fire torches, etc. As another example, the base 404 may be adapted with lighting elements that may illuminate the base through the housing when the housing is translucent. As such, the base 404 may also be a visual display device of the entertainment system, in addition to providing central control capabilities.

As described above, the base 404 may be communicatively coupled to the user interface 402, where the user interface 402 may be configured to receive input from the user, convert the input into a transmissible signal, and transmit the signal to the base 404 as executable instructions. In response to the instructions, the base 404 may be configured to adjust operation of the display devices of the network by sending instructions to the display devices, based on the signal from the user interface 402, via a transmission mode corresponding to the particular display device. For example, the user input may include requesting increased flame intensity at torches communicatively coupled to the base 404 by Bluetooth technology, while requesting decreased flame intensity at fire pits, the fire pits communicatively coupled to the base 404 by hard-wired connections. Upon receiving the instructions from the user interface 402, the base 404 may convert the instructions into suitable formats, transmit a first command to the torches as a UHF radio wave and transmit a second command to the fire pits, through a communication cable, as an electromagnetic signal. The base 404 may also be configured to receive signals, via a suitable transmission mode from the display devices to provide feedback on a response of the display devices to the transmitted instructions. In some examples, the feedback may be further relayed to the user interface 402 to provide confirmation to the user of the reciprocating adjustments to the display devices.

The user interface 402 may be a portable computing device, such as a tablet, that is coupled to the base 404 via at least a wireless communication link. For example, the user interface 402 may communicate with the base 404 over a wireless network, by a Bluetooth connection, etc. The user interface 402 may also be communicatively coupled to the base 404 by a hard-wired connection, e.g., a communication cable. In one example, the user interface 402 may be charged via a charging cable coupled to ports at each of the user interface 402 and the base 404.

By enabling the user interface 402 to communicate with base 404 wirelessly, the user interface may be positioned at a distance, e.g., spaced away, from the base 404 within a threshold radius of the base 404. The threshold radius may be a furthest distance of separation between the user interface 402 and the base 404 that maintains wireless connectivity therebetween, e.g., the threshold radius may be a maximum communication range of transmitters and receivers of the user interface 402 and the base 404. In this way, the user interface 402 may be positioned at a location convenient for the user to control the entertainment system. For example, when the entertainment system is located in a backyard of a house, the user interface 402 may be mounted to a wall of the house, proximate to the backyard. The user interface 402 may also be mounted directly at the base 404 or at the housing of the base 404.

The user interface 402 may include a user-interactive display screen 410, which may be a touch screen, for example. However, other configurations of the user interface 402 are possible without departing from the scope of the present disclosure. For example, the user interface 402 may instead be similar to a remote controller, having a plurality of buttons for selecting commands. In other examples, the user interface 402 may have a combination of a screen, without or without touch-input capabilities, and buttons. In yet other examples, the user interface 402 may further be configured to receive voice commands via an audio receiver implemented at the user interface and/or include motion sensors, where detection of motion (or lack of detect motion) may adjust the user interface 402 between active and sleep operating modes.

Various options for operating the entertainment system may be available via the user interface 402. As shown in FIG. 4, the display screen may include user-selectable icons, such as a first icon 412 for selecting a flame-only mode. In the flame-only mode, fire devices of the display devices, such as torches and fire pits, may provide visual display of flames without projecting sounds or exhibiting lighting effects, for example. A second icon 414 displayed at the display screen 410 of the user interface 402 may allow the user to adjust flame intensity at one or more of the fire devices. A third icon 416 may enable synchronization of the fire devices to an audio input, such as music.

For example, upon selecting the third icon 416, the user may be prompted to choose an audio option, e.g., a song, a beat, a sound, etc. Furthermore, the user may indicate an audio input mode. As an example, a first audio input mode may include receiving the audio input via the aux input at the base 404. Alternatively, the user may select a second audio input mode, which may be a manual entry mode where the user may choose an audio option from a pre-set list of audio options saved at a processor memory of the control hub 400. As another example, the control hub 400 may be communicatively connected to a large scale audio database, such as the Internet or a Cloud server, allowing the user to search, locate, and select the audio option from the audio database in the second audio input mode. As yet another example, the audio input may be received from a mobile device or other personal computing device, that is communicatively linked to the user interface 402. The audio option, regardless of audio input mode, may then be played at the audio display devices of the entertainment system.

The flames of the fire devices may be variably driven, e.g., the flame intensity varied, according to the audio option. As an example, the flames may be driven in time to a beat of a song. A volume at which the audio option is projected, e.g., through speakers of the user interface 402 and/or through an audio display device coupled to the control hub 400 as a speaker, may be adjusted by the user by engaging a fourth icon 418 at the display screen 410 of the user interface 402.

The user interface 402 may also allow the user to set channels, e.g., the sub-groups described previously, where the display devices of the network may be grouped into channels according to the user's preference. For example, icons for a first channel option 422 and a second channel option 424 are shown at the display screen 410 of the user interface 402. Each channel option may represent a group of display devices selected from the display devices communicatively coupled to the control hub 400. As an example, the first channel option 422 may include the fire devices and the second channel option 424 may include water feature devices and/or lighting devices. The water feature devices may include water fountains, irrigation systems, etc., and the lighting devices may be individual lighting fixtures or may be lighting elements incorporated into the fire devices, water feature devices, and or at the control hub 400. By selecting the channel option, the user may modify operation of the corresponding group of display devices.

The icons displayed at the display screen 410 may change according to which channel option is chosen. For example, the icons shown in FIG. 4 may correspond to the selection of the first channel option 422 (which may be highlighted, for example, upon selection). The icons, therefore, represent parameters specific to the fire devices. When the second channel option is chosen, the icons may instead represent parameters specific to the water feature devices and/or lighting devices. However, when the group of display devices include display devices of different types, parameters corresponding to all of the included types of display devices may be presented.

In one example, the user may assign the display devices to the channel options. The user may navigate to a menu screen at the user interface 402, for example, where a menu displayed at the menu screen may include an option to create and/or modify the channel options. The user may then indicate and/or adjust which available display devices (e.g., the display devices detected to be coupled to the control hub 400) are to be included in a channel option. Further, the user may indicate which control parameters are associated with each channel option.

In another example, the channel options may not be selectable by the user, and may instead be an automatic selection to provide assigned groupings of the display devices, based on which display devices are detected to be coupled to the control hub 400. In addition, in some examples, when the channel options are automatically assigned, e.g., pre-set, the control parameters associated with each channel option may also be pre-set, therefore presenting the user with a set of allowable parameters which may be adjusted by the user. For example, the pre-set channels may include channels separating the available display devices based on type, on mode of communication, etc. In other examples, the user may choose a number of channel options to which the available display devices may be assigned. Alternatively, the number of channel options may be automatically set based on which display devices are coupled to the control hub 400.

When the user selects one of the channel options, e.g., taps or swipes an icon representing the channel option, or gives a voice command, etc., the control parameters for the channel option is displayed at the display screen 410. For example, as shown in FIG. 4, the first channel option 422 is selected and the control parameters for the fire devices are displayed. Upon selecting the second channel option 424, the control parameters for the display devices grouped into the second channel option 424 may instead be displayed. As such, the user may easily toggle between the channel options to modify the corresponding control parameters.

In yet other examples, the user may choose to not group the display devices into the channel options and may instead control each display device individually. For example, each display device may have a communication channel and/or IP address and operation of each display device may be controlled and adjusted independent of the other display devices. Furthermore, in some examples, the display devices may be grouped but the user may be able to input operating instructions to the display devices according to both the groups of display devices and to the individual display devices.

In some instances, entertainment programs may be provided to the control hub 400 as pre-set instructions for operating the entertainment system. For example, the user may subscribe to a service, e.g., a subscription service, providing various entertainment programs for the entertainment system. The entertainment programs may include, as an example, choreographed modification of the control parameters of the display devices according to music. In one example, the subscription service may provide lists of songs, lists of music according to genre, lists of performers, concerts, etc., and the user may choose a list, individual items from the list, or multiple items/multiple lists, depending on a subscription mode ascribed to the user. Each item may correspond to a specific song, recording, set of sounds, etc., to which operation of the display devices may be synchronized in a pre-determined manner.

As a non-limiting example, the user may pay a monthly subscription fee to access a collection of entertainment programs at, for example, a host website. The entertainment programs available to the user through the monthly subscription fee may depend on which display devices are included in the user's entertainment system. For example, the entertainment system may include both fire devices and water feature devices. The available entertainment programs may therefore be pre-set displays of both the fire devices and the water feature devices, only the fire displays, and only the water feature devices, synchronized to an audio display (e.g., a song, a recording, a set of sounds, etc.). Upon selection of an entertainment program, the entertainment program may be executed at the entertainment system, as commanded via the control hub 400.

A third example of a control hub 500 is illustrated in FIG. 5. The control hub 500 may be configured as a single unit that incorporates components of the user interface 402 and the base 404 of the control hub 400 of FIG. 4. For example, the control hub 500 may include a display screen 502 that displays icons 504 representing various display device types and their associated control parameters, such as audio only, fire display only, LED light show, streaming music, combined audio and fire display, etc. The display screen 502 may also be touch-sensitive and receive input from a user via contact with the display screen 502. Other information may be provided on the display screen, such as time, active communication mode, etc. A panel of buttons 506 may be arranged adjacent to the display screen and allow the user to select between viewing operating modes, music bands, a menu of options, and other viewable options, at the display screen 502. A control knob 508 may also be provided for adjusting displayed parameters, e.g., by scrolling through the parameters, for increasing/decreasing a magnitude of the displayed parameters, and the like. In some examples, the control knob 508 may also operate as a button for selecting an option from the display screen 502 and then controlling the option by rotation of the control knob 508 as a dial. The control hub 500 may further include various hardware for signal transmission, signal reception, and processing of information, as described above, for enabling communication with and control of display devices communicatively coupled to the control hub 500.

Figure 6:
FIG. 6 shows a fourth exemplary embodiment of a central control hub.
Figure 7:
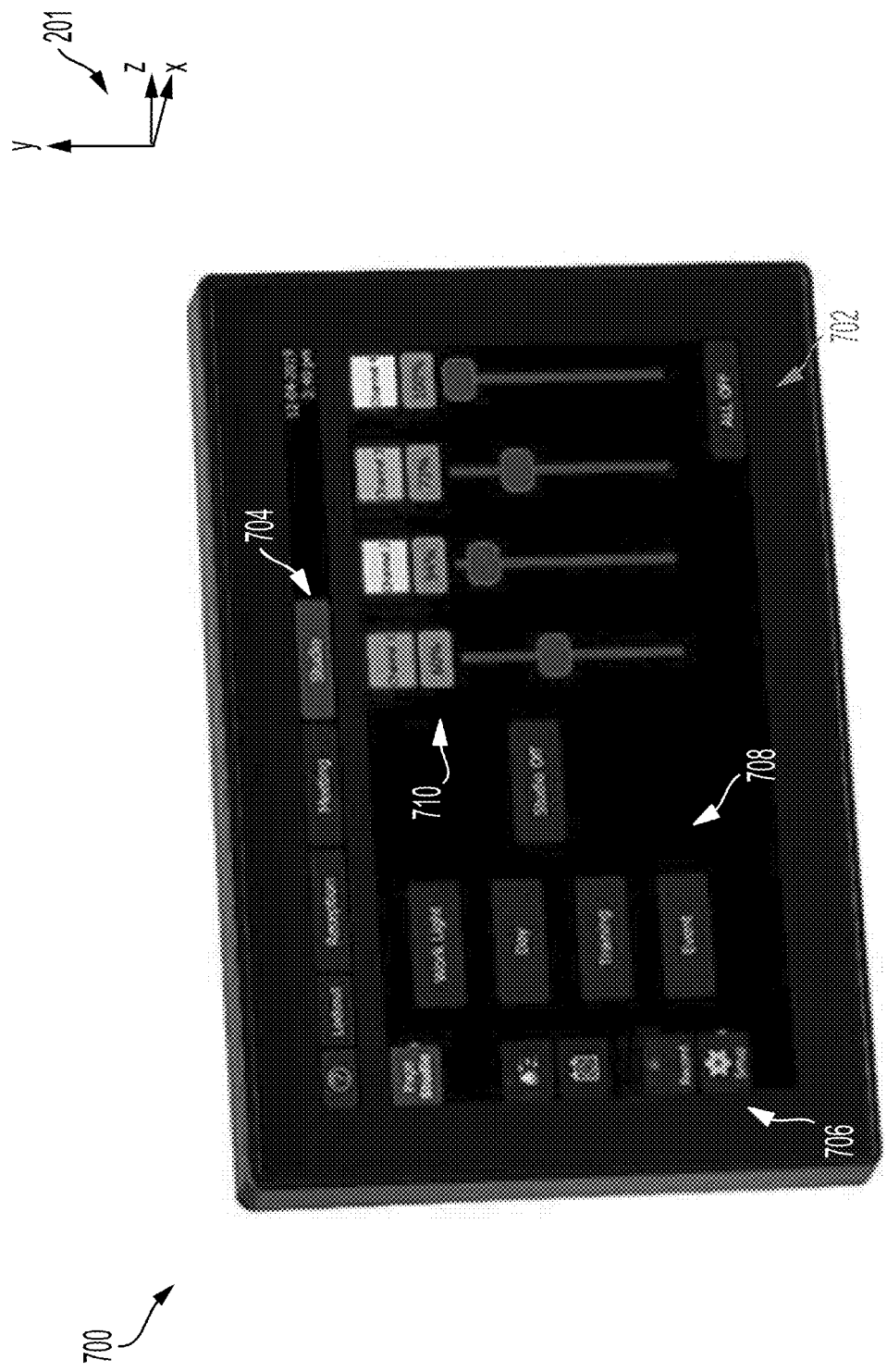
FIG. 7 shows a fifth exemplary embodiment of a central control hub.

A fourth example of a control hub 600 and a fifth example of a control hub 700 are shown in FIGS. 6 and 7, respectively, the fourth example of the control hub 600 having a display screen 602 and the fifth example of the control hub 700 also having a display screen 702. Each of the control hubs 600, 700 may be similarly configured with display options, operating parameter controls, communication links, various hardware and software, etc., as described above for the control hubs of FIGS. 2-5, but illustrate variations in how information is displayed at the respective display screens. For example, turning first to FIG. 6, the control hub 600 also includes a panel of buttons 604 and a control knob 606. A first live link 608 for streaming music is indicated as selected and an upper region (with respect to the y-axis) of the display screen 602 presents a song and artist currently streaming. The display screen 602 also shows a second live link 610 for allowing a user to view new commercially available products, e.g., display devices, that are compatible with the control hub 600.

The control hub 700 of FIG. 7 does not include a panel of buttons (e.g., mechanical buttons such as the panel of buttons 506 of FIG. 5 and 604 of FIG. 6) or a control knob. Instead, all control capabilities are provided on the display screen 702, showing grouped icons, a portion of which may be arranged hierarchically across the display screen 702. For example, a first group of icons 704 may allow a user to choose a location amongst a set of locations where communicatively coupled display devices are located. The locations shown in FIG. 7 include a lookout area, a reception area, a meeting room, and a studio, of which the studio is shown as selected. A second group of icons 706 depict control parameters associated with the display devices located in the studio and a second third group of icons 708 show options according to a selected icon from the first group of icons 704. A fourth group of icons 710 show channel options and a user-adjustable sliding control for each channel option. For example, each sliding control may adjust a percentage of intensity for the respective devices on the channel, where 100% is a maximum intensity and 0% is a minimum intensity. In examples where a channel comprises fire devices, for example, the percentage may be indicative of a base strength of the flames. In examples where a channel comprises lighting devices, for example, the percentage may be indicative of a base brightness for the lighting devices. Other devices may be adjusted in intensity via such channel percentages.

In this way, the display devices of the entertainment system may be controlled and operated by the control hub. In one example, integrated control of all networked display devices is provided at a single, user-interactive display screen. The user may directly adjust the control parameters for specific display devices and/or groups of display devices, including selecting an audio input to which operation of the display devices may be synchronized. The control hub therefore enables a high degree of flexibility in operating the entertainment system, enabling direct user input to determine an operating mode of the entertainment system, which effects are displayed by the entertainment system, and how the effects are displayed. By allowing the user to also choose subscriber-based entertainment programs, an operating option with an intentionally lower degree of operating flexibility and a lower demand for user input may be provided. The entertainment programs may deliver pre-set instructions for operating the entertainment system which may not be altered or modified by the user. The entertainment programs may therefore alleviate a burden on the user to decide how the display devices are operated.

For example, the entertainment programs may include preset backyard settings, which may provide, as one example, a Party Mode, a Relax Mode, and a Custom Mode. The Party Mode, when selected, may set fire display devices to a Bluetooth technology mode (BTM mode) for receiving instructions from the control hub, as well as lighting devices. Parameters of the fire display devices (e.g., flame height/intensity) and of the lighting devices (pulsing and/or changes to brightness) may include flames and illumination provided by the devices in time to music that is streamed in response to operation in the Party Mode. The music may be streamed according to a pre-set Party radio station, which may play upbeat music.

The Relax Mode may include operating of the fire devices with only flames (no pulsing) at a highest intensity. The lighting devices may be adjusted to 50% brightness and a Relax radio station may be streamed, which may play relaxing music. Alternatively, the Custom Mode may allow the user to define customized pre-set settings for the entertainment programs.

A plurality of radio stations may be provided by subscription to a streaming channel. The streaming channel may include the Party radio station, the Relax radio station, a Festival Live radio station, which may stream live music from music festivals, and a Finds radio station, which may stream new music located based on search algorithms implements at the control hub.

Additionally, a monthly subscription may be provided to deliver curated shows on a weekly basis. For example, a weekly download may be sent to each subscribing member that may provide updates to services and products, troubleshooting information, information regarding how to use services, and live links to view new products (as shown in FIG. 6), which may allow the user to purchase products directly through the control hub. In some examples, the monthly subscription may also provide a curated show to a specific song on a specific day of the week (e.g., on Fridays) as well as during holidays as bonus shows. Operation of the display devices, including the fire devices, the lighting device, and speakers, may be coordinated according to a program developed each week, which may be particularly desirable for a commercial environment, such as a bar or a hotel.

The entertainment system may be controlled by the control hub based on different input modes and techniques. For example, the user may activate the control hub by interacting with the user interface, such as by touching the display screen of the user interface, gesturing in front of the user interface, and/or by voicing a command. Commands may be input to the control hub by touch (e.g., swiping/tapping the display screen) and/or delivering vocal instructions. The input received from the user may be transmitted to the display devices according to a communication mode of the display devices, such as a hard-wired connection via a communication cable, a wireless network such as a wireless local area network (WLAN), Bluetooth connectivity, infrared communication, a direct radiofrequency channel between the display devices and the control hub, etc.

Furthermore, additional input devices may be linked to the control hub, e.g., either to the user interface or directly to receivers of the control hub, such as mobile devices with permitted communication with and access to the control hub. In some examples, features shown at the display screens of the control hubs of FIGS. 4-7 may be adapted for mobile devices. The user may thereby control the entertainment from a remote location over a mobile communication system. The entertainment system may incorporate different types of communication modes and the associated hardware and software for enabling the communication modes may be integrated into a single control hub. In some examples, the control hub may be customized according to an anticipated configuration of the entertainment system. For example, the user may request that the control hub include only transmitters and receivers for Bluetooth connectivity if the only Bluetooth communication is to be utilized amongst the display devices and the control hub.

Additional benefits of the entertainment system include optional automated operation of the lighting devices. For example, the lighting devices may be grouped according to zones and a brightness of each group may be set independently. The control hub may provide different operation modes, including a Green mode where all of the lighting devices may be maintained at 70% brightness. As the lighting devices may each be configured with a motion sensor that enables detection of motion within a threshold proximity to the lighting device, when motion is detected at one or more of the lighting devices, the lighting devices may be commanded to increase their brightness. In another example, the lighting devices may be operated in a People detecting mode where the lighting devices are maintained at 70% brightness when no motion is detected. As a person approaches one of the lighting devices, the lighting device may be activated and turned on and its brightness slowly increased as the person moves closer to the lighting device. As the person moves away and leaves the threshold proximity of the lighting device, the brightness of the lighting device may be decreased to 70%.

Turning now to FIG. 8, it shows an example block diagram of a network 800 of an entertainment system, such as the entertainment system 120 of FIG. 1. As seen in FIG. 8, a control hub 802 is configured to receive an audio input 804 via an audio input source 806 and a user input 808 via a user input device 810. The control hub 802 may be configured as any of the control hubs of FIGS. 2-7. However, preferred embodiments may include the control hubs shown in FIGS. 4-7 having a user-interactive display screen, such as a touch screen. In particular, the control hub 802 may be implemented as a mobile device, as one example. That is, the mobile device itself may be the control hub 802. In examples where the mobile device itself is the control hub 802, it is noted that the user-interactive display screen may be accessed via an application on the mobile device. The control hub 802 may further include at least one wireless receiver 812 for receiving one or more of the audio input 804 and the user input 808 in wireless form, as described above. Additionally or alternatively, the control hub 802 may be configured to receive one or more of the audio input 804 and the user input 808 via at least one wired connection.

The audio input source 806 may be a user device, such as a mobile device or other personal computing device, in one example. In other examples, however, the audio input source 806 may be a streaming music service, as described above. Thus, in examples where the control hub 802 receives the audio input 804 wirelessly, the audio input 804 may be streamed from the audio input source 806 to the wireless receiver 812 of the control hub 802. In examples where the audio input 804 is received from the user device via a wired connection, it is noted that a wired connection may be provided between the user device and the control hub 802. For example, the wired connection may be provided via an aux input, though it is noted that other wired connection options are also possible.

The user input 808 may be received via one or more user input devices 810 of the control hub 802. For example, the user input device(s) 810 may be mobile devices that are communicatively coupled to the control hub 802. In some instances, as described above, the user input device 810 may be integrated into a single unit as the control hub 802, e.g., as a touch screen. The user input 808 may be a signal provided to the control hub 802 indicating one or more of a requested volume adjustment and a requested mode for the control hub 802, for example. The requested mode may include any of the modes discussed herein, such as the audio mode, the traditional mode, the flame boost mode, and the off mode, for example.

The control hub 802 includes instructions stored in non-transitory memory that are executable to actuate various components responsive to receiving one or more of the audio input 804 and the user input 808. Thus, responsive to receiving one or more of the audio input 804 and the user input 808 at the control hub 802, the control hub 802 may output control signals to actuate one or more components, such as components included in one or more visual display devices, e.g., fire devices 814 and one or more audio display devices, e.g., speakers 816. The fire devices 814 may include any of the torches and fire pits disclosed herein, for example. The speakers 816 may include the speakers formed into the control hub 802, in at least one example, as well as speakers coupled to the control hub 802, such as the speaker 112 of FIG. 1.

As an example, the user input 808 may include a request to increase or decrease a volume. In response to the request, the control hub 802 may output an audio control signal 818 to adjust a volume output of one or more of the speakers 816. As another example, the user input device(s) 810 may include a request a request to operate the entertainment system in the traditional mode. In response to the request, the control hub 802 may output a visual control signal 820 to the fire devices 814 to electrically actuate an electric valve in each of the one or more fire devices accordingly, the valve controlling fuel flow to a burner of the respective fire device. The visual control signal 820 may include a command to actuate the electric valve to a base set position for the traditional mode, as previously discussed above.

If the traditional mode is requested via the user input 808, it is noted that the visual control signal 820 output to the fire devices 814 is not based on the audio input 804, even if the audio input 804 is being received at the control hub 802. Rather, in the traditional mode, the control hub 802 outputs the visual control signal 820 to the fire devices 814 to actuate the electric valve to the base position for the traditional mode regardless of the audio input that may be received. However, in at least one example, it is noted that the control hub 802 may output the audio control signal 818 to the speakers 816 based on receiving the audio input 804, even when in the traditional mode. That is, the audio input 804 may be provided via the speakers 816 of the hub in the traditional mode, though the audio input 804 is not being used to adjust a position of the electric valve.

As another example, the user input 808 may include a request to operate in the audio mode and the control hub 802, upon receiving an audio input 804, may output the visual control signal 820 to the fire devices 814 to electrically actuate the electric valve in each of the fire devices 814, where the visual control signal 820 is based on the audio input 804 received. For example, the audio input 804 may be a music input, and the control hub 802 may output the visual control signal 820 based on the audio input 804 to adjust the electric valve position and coordinate the flame height and size of the fire devices to the audio input 804. In this way, the position of the electric valve may be varied in the audio mode in a manner coordinated with the audio input 804.

In cases where the audio mode request is received at the control hub 802 via the user input 808 but the audio input 804 is not being received at the control hub 802, the control hub 802 may output the visual control signal 820 to the fire devices 814 to actuate the electric valve in each of the fire devices to an audio mode base position. The audio mode base position may be a same or different position than the traditional mode position. In at least one example, the audio mode base position may be an at least partially open position that is less than the wide open position for the valve.

In one or more examples, the control hub 802 may be coupled to the fire devices via a common line (e.g., a communication cable), where the common line is coupled to the control hub 802 via one or more ports. In such examples where the control hub 802 is coupled to the fire devices via the common line, it is noted that the visual control signal 820 output from the control hub 802 to the common line is provided to all of the fire devices coupled to the common line.

The control hub 802 may be coupled to additional display devices, including lighting devices 824, such as the lighting devices 114 of FIG. 1, and water features 826, which may be devices providing displays based on water, such as fountains. The water features 826 may include integrated lighting devices such that, when instructed by the control hub 802, may vary an intensity of water flow, spray, pressure, etc., as well as a brightness and pulsing of illumination by the integrated lighting devices, in a synchronized manner with respect to the audio input 804 and/or the user input 808. Similarly, the lighting devices may be commanded to vary their brightness and/or be pulsed in time to the audio input and/or according to the user input 808. The control hub 802 may therefore send a lighting device signal 828 and a water features signal 830 to the lighting devices 824 and the water features 826, respectively, to produce desired outputs at the display devices.

In at least one example, the hub may further comprise a battery 822. The battery 822 may serve as a source of power to one or more of the control hub 802, the user input device(s) 810, the speakers 816, the lighting device 824, and the water features 826 of the network 800. The battery 822 may further provide power to charge a user mobile device via a USB port. In at least one example, the battery 822 may be a 9800 mAh battery that is chargeable via a charging port, as previously described.

A method 900 for operating an entertainment system, the entertainment system including a network, is depicted in FIG. 9. The network includes a control hub and one or more display devices communicatively coupled to the control hub, where the control hub is configured to control operation of the one or more display devices. The entertainment system may be, as one example, the entertainment system 120 of FIG. 1, and may include, in addition to fire only devices (e.g. torches), audio only devices (e.g., speakers), and combination fire and audio devices (e.g., one of the fire pits), other types of visual display devices, including lighting devices and water feature devices. Instructions for carrying out the methods 900 and 1000 may be executed by a controller, such as the hub 110 of FIG. 1, and any of the control hubs of FIGS. 2-7, based on instructions stored on a memory of the control hub and in conjunction with signals received from transmitters of the entertainment system, such as from a user interface of the control hub. The control hub may output command signals to receivers of the one or more display devices to adjust operation of the one or more display devices, according to the methods described below.

At 902, the method 900 includes confirming if the control hub is on, e.g., electrically connected to a power source and ready to relay signals. For example, the control hub may be on when a toggle switch, such as the toggle switch 228*a* of FIG. 3 or the toggle switch 409 of FIG. 4, is adjusted to an "on" position. If the control hub is not on, the method 900 proceeds to 904 to maintain a current operating status of the control hub. As an example, the control hub may be off, e.g., deactivated, or in a stand-by/sleep mode. The method 900 returns to the start.

If the control hub is on, the method 900 continues to 906 to detect and identify the one or more display devices communicatively coupled to the control hub. The network may include various audio and visual display devices, including but not limited to fire devices (e.g., fire pits and torches), water feature devices, lighting devices, and speakers. Detecting and identifying the one or more display devices may, in some examples, include transmitting querying signals to the one or more display devices to determine which of the one or more display devices are in an active mode and ready to be operated. For example, each of the display devices may include switches for adjusting the respective display device between on/off modes. As such, only the display devices adjusted to the on mode (e.g., active display devices) may be deemed an active member of the network of the entertainment system and operation of the one or more display devices may be constrained to the active display devices. Upon detecting and identifying device type, quantities of each type, device status, etc., method 900 includes confirming if user input is received at 908.

User input may be delivered to the control hub by one or more techniques, including touch input at a display screen of a user interface of the control hub and/or at buttons of the user interface and/or control hub, voice commands input to audio receivers of the control hub, gesturing within a detection region of motion detectors of the control hub, a communication link coupling the control hub to a mobile device, etc. The user input may therefore be detected by suitable receivers at the control hub, e.g., detectors for detecting pressure at the display screen, the audio detectors, and the motion detectors, etc. If the user input is not received, the method 900 proceeds to 910 to operate the one or more display devices according to previous operating parameter settings (e.g., as stored at the memory of the control hub). The method 900 returns to 908.

If reception of the user input is confirmed, the method 900 continues to 912 to convert the user input into signals according to the communication modes of the one or more display devices that are active. As an example, the one or more display devices may communicate with the control hub via different types of communication modes, including hardwired communication modes (e.g., communication cables), and wireless communication modes (e.g., WLAN, Bluetooth, infrared communication, direct radiofrequency channel, etc.). The signals may be converted to a communication mode suitable for a respective display device and thereby delivered, e.g., transmitted, to the respective display devices at 914. The method 900 then returns to the start.

Turning now to FIG. 10, a second example system environment 1000 is shown. One or more of the display devices shown in the second example system environment 1000 may be the same or similar to the display devices previously discussed herein. Furthermore, it is noted that the same or similar hub and hub control discussed previously herein may further be carried out in the second example system environment.

As detailed below, though there are different types of display devices included in FIG. 10, each of the display devices comprise a network-based controller. When the network-based controllers of the display devices are connected to the same network, the same input (such as an audio input) can be used to control the different types of display devices in a manner that is synchronous.

Looking to FIG. 10, the second example system environment 1000 includes both an indoor environment 1002 within an RV 1004, as well as the outdoor environment of the campsite because display devices connected to the network 101 of the entertainment system 120 are located both in the RV and outside in the campsite.

The display devices connected to the network 101 in FIG. 10 provide various types of entertainment displays, where the types of displays include fire, water, lighting, and audio based entertainment displays. It is noted that the lighting type displays refer to electric lighting displays. Each individual display device may be configured to provide an entertainment display comprising one or more of the different types of displays.

The display devices connected to the network 101 of FIG. 10 include fire torches 102*a*, 102*b*, 102*c*, 102*d* (also referred to as fire torches 102), fire pit 1006 (which may be the same or similar to fire pit 104*c*), speakers 112, lighting devices 114, and one or more water devices 1008.

The fire torches 102 in FIG. 10 provide a fire display and may not comprise speakers to provide an audio output. Thus, the fire torches 102 in FIG. 10 may be referred to as fire only devices. The fire pit 1006 may provide a fire display and an audio output, where the audio output is provided via a speaker integrated into the fire pit 1006. Thus, the fire pit 1006 may be referred to as a combination fire and audio device. The speakers 112 may provide an audio output without providing other types of entertainment displays. Thus, the speakers 112 may be referred to as audio only devices. The lighting devices 114 may provide an electric light output without providing other types of entertainment displays. Thus, the lighting devices 114 may be referred to as lighting only devices. Alternatively, it is noted that one or more of the lighting devices 114 may further have a speaker integrated therein to also provide an audio output. In such examples, these particular lighting devices may be referred to as combination lighting and audio devices. Lastly, water features 1008 may provide a water display without providing other types of an entertainment display. Thus, the water devices 1008 may be referred to as water only devices. Alternatively, one or more of the water devices 1008 may further have a speaker integrated therein to also provide an audio output. In such examples, these particular water devices may be referred to as combination water and audio devices. Other combinations of the types of entertainment displays are possible without departing from the scope of the disclosure. It is noted that devices which output multiple types of displays for entertainment may be collectively referred to as combination display type devices, whereas devices which only output one type of display for entertainment may be collectively referred to herein as single display type devices.

In order to connect to the network 101, each of the display devices comprises a network-based controller 1010. The network-based controller 1010 may connect the respective display device for which it is provided to the network 101 via a wireless connection. The wireless connection may be a short-range wireless connection such as a Bluetooth connection, for example. Other wireless connection types such as WLAN are also possible, however. Via connection of the network-based controllers 1010 of the various types of display devices to the network 101, the different types of display devices are able to be controlled in a synchronized manner via hub 110.

In one or more examples, each of the display devices may further comprise a connect mode input 1012, where the connect mode input 1012 may be a button, dial, or other user input on the display device. Responsive to activation of the connect mode input 1012 for a display device (e.g., by pushing the connect mode button), the network-based controller 1010 of the same respective display device automatically searches for a wireless network to join. Once a network is found, the respective display device may then proceed to join the network (e.g., join via a Bluetooth connection). Thus, in the example at FIG. 10, the display devices join the network 101 by, after activation of the connect mode input 1012, searching for a network via network-based controller 1010, and once network 101 is found, the network-based controller 1010 proceeds to join the network 101 via a wireless connection such as a Bluetooth connection.

In some examples, the display device may join the network automatically without the need for authentication (e.g., if the display device has previously joined the network). In other examples, authentication of the display device may be required before allowing the display device to join the network. For example, user authentication of the display device may be required at the hub 110 prior to allowing the display device to join the network.

Though the display devices of FIG. 10 provide different types of displays for entertainment, because the display devices are connected to the same network 101 via their respective network-based controllers 1010, they are able to be controlled in a synchronous manner.

As just one example, the hub 110, which is shown as a mobile device in FIG. 10, is connected to network 101 in FIG. 10. Further, all of the display devices discussed above concerning FIG. 10 are also connected to the network 101. An audio input may be provided from the hub 110 to the display devices on the network 101 as part of a request for a multi-media entertainment display 120. The respective network-based controllers 1010 of the display devices on the network 101 receive the audio input from the hub 110. Then, responsive to receiving the audio input from the hub 110, the network-based controllers 1010 provide a display via their respective display devices by actuating components of their respective display device. For example, the network-based controllers 1010 for the fire torches 102 may actuate one or more valves and/or an ignitor based on the audio input to adjust the fire display of the fire torches 102. As another example, the network-based controllers 1010 for the water devices 1008 may actuate a pump to adjust the water display for the water devices 1008. As a further example, the network-based controller 1010 for the fire pit 1006 may both actuate the speaker of the fire pit 1006, as well as one or more valves and/or an ignitor based on the audio input to adjust the combination fire and audio display of the fire pit 1006.

Thus, the same audio input from hub 110 may be used by the respective network-based controllers 1010 of the display devices on the network 101 to provide different types of displays, where these different types of displays are coordinated to the same input (e.g., audio input) and thus are also coordinated with each other.

Turning now to FIG. 11, FIG. 11 shows a second example method for operating the entertaining system. The method 1100 may be carried out via one or more of the display devices discussed herein. It is noted that method 1100 is carried out for cases in which more than one type of display device is connected to the same network as a hub.

At 1102, method 1100 comprises determining whether or not a display request has been received at hub (e.g., hub 110). The display request may be a request for display devices on a same network as the hub 110 to provide a display. For example, the display request may include a request for the display devices to provide a display coordinated to an audio input, such as music. In one or more examples, the hub 110 may be a mobile device or other personal computing device. Thus, determining whether or not a display request has been received may include determining whether or not a user input has been received via an application of the mobile device to provide a display request. If it is determined that no display request has been received, then method 1100 proceeds to step 1104 to maintain a current status for the hub and all display devices on a same network as the hub. Following 1104, method 1100 returns.

If it is determined that a display request has been received at 1102, then method 1100 proceeds to 1106. It may be determined that a display request has been received responsive to detecting a user input. The user input may be received via the hub, such as through an application on a mobile device, in at least one example. The display request may be a request for display devices on the same network as the hub to provide a display coordinated to an audio input, in at least one example.

At 1106, method 1100 includes providing a command from the hub to display devices on the same network as the hub. In particular, 1106 includes providing a command from the hub to different types of display devices on the network. The command may include the audio input, in at least one example. It is noted that the same command may be provided to the display devices on the network.

Following 1106, method 1100 proceeds to 1108. At 1108, each of the display devices that received the command from 1106 converts the command into signals based on the display device type. In particular, the network-based controller (e.g., network-based controller 1010) for each of the devices that received the command converts the command into signals for actuating the device based on the particular display device type. For example, a first display device that receives the command may be a fire only device (e.g., torches 102) and a second display device that receives the command may be a combination fire and audio device (e.g., fire pit 1006). Thus, although the same command is received at both the first display device and the second display device in this example, the respective network-based controller in each of the first display device and the second display device will convert this same command into different signals based on the different device types. In this example, the first display device (fire only) may convert the command into signals for actuating one or more valves and/or an ignitor based on the command without any audio actuation commands. The second display device (a combination fire and audio), in contrast, may convert the command into signals for both actuating one or more valves and/or an ignitor, as well as actuating a speaker based on the command. In a case where the command is an audio command, it is noted that both the signals for the first display device and the second display device will be coordinated to the audio command.

Following 1108, method 1100 proceeds to 1110. At 1110, the different types of display devices are actuated based on the signals from 1108. In this way, using the same command (e.g., an audio command such as music), different types of display devices may be operated. As a result, different types of display devices are able to be actuated in coordination to the same command output from the hub.

In some examples, the user input may include instructions for only a portion of the active display devices of the one or more display devices. For example, the active display devices may include fire devices and lighting devices but a user may choose to only operate the fire devices and the lighting devices may remain in a stand-by mode, or the user may select only a portion of the fire devices and/or a portion of the lighting devices to be operated. Furthermore, as described above, the one or more display devices may be grouped into channels, which may be assigned by the user or automatically selected and assigned based on device type, communication mode, etc. The user may input commands to one of the channels, all of the channels, or a portion of the channels.

As another example, the control hub may receive an audio input via a hard-wired connection (e.g., a cable coupled to an aux in port of the control hub) or by a wireless connection, where the audio input may be, for example, music provided by a mobile device or an audio device, such as a device for playing audio files. The audio input may also be an audio selection indicated and chosen by the user at the user interface of the control hub. The user input may further include a request for the operation of the active display devices to be synchronized to the audio input. Operating parameters of the active display devices may therefore be adjusted according to the audio input as determined and monitored by audio receivers of the control hub, e.g., audio receivers configured to read and interpret an audio file delivered by the audio input and/or detect and monitor audio effects of the audio input (e.g., frequency, volume, rhythm, etc.) as the audio input is translated to sound broadcasted by the audio display devices. For example, flame intensity at the fire devices, water flow at the water feature devices, and light intensity/color at the lighting devices may be pulsed and varied to provide visual effects of the entertainment system that complement the audio effects.

In this way, networked display devices of an entertainment system may be coordinated in a simple manner. It is noted that reference to signals, such as input signals, output signals, and control signals, refer to electric signals, in at least one example. The signals may be transmitted and received at a control hub of the entertainment system, the control hub configured to communicate with the display devices via a variety of communication modes. The control hub may provide centralized, customizable control of the entertainment system, thereby allowing a user to adjust all display devices connected to the control hub easily, e.g., without specialized knowledge or skill, and efficiently.

The disclosure also provides support for a method for operating an entertainment system, comprising: receiving user input at a central control hub communicatively coupled to one or more display devices, the user input including instructions for adjusting operating parameters of the one or more display devices of the entertainment system, the one or more display devices including one or more of speakers, fire devices, lighting devices, and water feature devices, converting the instructions into one or more signal transmission modes at the central control hub, the one or more signal transmission modes corresponding to communication modes of the one or more display devices, and delivering the instructions to the one or more display devices from the central control hub via the communication modes of the one or more display devices to output a display at the one or more display devices, the display including visual and/or audio displays, based on the instructions. In a first example of the method, adjusting the operating parameters of the one or more display devices includes adjusting the operating parameters to synchronize operation of the one or more display devices to an audio input, and wherein the audio input is one or more of an audio signal received through an aux in port of the central control hub and an audio signal received at the central control hub through a wireless communication link. In a second example of the method, optionally including the first example, adjusting the operating parameters to synchronize the operation of the one or more display devices includes one or more of varying a flame intensity of fire devices, a lighting effect of lighting devices, and a flow of water through water feature devices, according to audio effects of the audio input. In a third example of the method, optionally including one or both of the first and second examples, receiving the user input at the central control hub includes receiving user input at a user interface of the central control hub, and wherein the user interface is configured to receive the user input via one or more of touch, sound, and gestures. In a fourth example of the method, optionally including one or more or each of the first through third examples, converting the instructions into one or more signal transmission modes includes converting the instructions into hard-wired transmission modes and wireless transmission modes. In a fifth example of the method, optionally including one or more or each of the first through fourth examples, delivering the instructions to the one or more display devices includes delivering the instructions via one or more of a communication cable, a local wireless network, a Bluetooth connection, and a radiofrequency channel. In a sixth example of the method, optionally including one or more or each of the first through fifth examples, delivering the instructions to the one or more display devices includes transmitting the instructions via wireless transmitters of the central control hub when the one or more signal transmission modes includes the wireless transmission modes. In a seventh example of the method, optionally including one or more or each of the first through sixth examples, the method further comprises: receiving the instructions at receivers of each of the one or more display devices. In a eighth example of the method, optionally including one or more or each of the first through seventh examples, receiving the user input includes receiving the user input as instructions for groups of the one or more display devices to groups, and wherein the one or more display devices are assigned to the groups by one of user selection or automatic selection according to display device type. The disclosure also provides support for an entertainment system, comprising: a network, including, one or more display devices, the one or more display devices including audio display devices and visual display devices, a control hub communicatively coupled to the one or more display devices via one or more communication modes, the control hub configured to relay signals to coordinate operation of the one or more display devices in response to user input received at the control hub. In a first example of the system, the audio display devices includes speakers and the visual display devices includes fire pits, fire torches, water feature devices, and lighting devices. In a second example of the system, optionally including the first example, the control hub is a mobile device. In a third example of the system, optionally including one or both of the first and second examples, the control hub includes a user interface communicatively coupled to a base, and wherein user interface is communicatively coupled to the base via one or more of a hard-wired connection and a wireless connection. In a fourth example of the system, optionally including one or more or each of the first through third examples, the user interface is a tablet with a display screen and wherein the display screen is configured to receive the user input by one or more of touch, sound, and detection of movement. In a fifth example of the system, optionally including one or more or each of the first through fourth examples, control parameters of the one or more display devices are displayed at the display screen and configured to be adjustable at the display screen by the user input. In a sixth example of the system, optionally including one or more or each of the first through fifth examples, the control hub is configured to receive an audio input and, in response a request from a user to synchronize operation of the one or more display devices to the audio input, to relay instructions to the one or more display devices to coordinate adjustments to operating parameters of the one or more display devices to the audio input. In a seventh example of the system, optionally including one or more or each of the first through sixth examples, the audio input includes one or more of an audio signal received through an aux in port of the control, and an audio signal received through a wireless communication link between the control hub and another device. The disclosure also provides support for a method for providing audio and visual entertainment, comprising, responsive to user input received at a central control hub, sending the user input to one or more display devices communicatively coupled to the central control hub via one or more communication modes to synchronize operation of the one or more display devices to an audio input. In a first example of the method, sending the user input to the one or more display devices includes sending instructions for pre-set programs provided by a subscription service for operating the one or more display devices. In a second example of the method, optionally including the first example, sending the user input to the one or more display devices includes one or more of sending individual operating instructions for each of the one or more display devices and sending instructions for operating groups of the one or more display devices. The disclosure also provides support for a multi-media display system, comprising, a hub, a first display device comprising a first network-based controller, and a second display device comprising a second network-based controller, wherein the first display device, the second display device, and the hub are on a network, wherein the first display device is a different type of display device than the second type of display device, and wherein the first network-based controller comprises instructions stored in non-transitory memory that when executed cause the first network-based controller to: receive a command from the hub that includes an audio input, convert the command into first display device signals that are based on the audio input, and actuate the first display device based on the first display device signals, wherein the first display device signals are different than second display device signals, and wherein the second display device signals are converted from the same command and are based on the same audio input as the first display device signals. In a first example of the system, the first display device is a fire display device. In a second example of the system, optionally including the first example, the second display device is one of an audio only device, a water device, and a lighting device. In a third example of the system, optionally including one or both of the first and second examples, the first display device is a fire only display device, and wherein the second display device is one or more of an audio device, a water device, and a lighting device. In a fourth example of the system, optionally including one or more or each of the first through third examples, the first display device is a single type display device, and wherein the second display device is a combination type display device. In a fifth example of the system, optionally including one or more or each of the first through fourth examples, the first display device is a fire only display device, and wherein the second display device is a combination fire and audio device. The disclosure also provides support for a method, comprising: receiving an audio input at a first display device via a network, and responsive to the first display device receiving the audio input, providing a fire only display via the first display device that is coordinated to the audio input, wherein a second device connected to the network only provides an audio output responsive to receiving the audio input. In a first example of the method, the audio input received at the first device is the same audio input that is received at the second device. In a second example of the method, optionally including the first example, the audio input is received from a hub. In a third example of the method, optionally including one or both of the first and second examples, the audio input is part of a display request input to the hub. In a fourth example of the method, optionally including one or more or each of the first through third examples, the audio input is received as part of a command for a display, and wherein the first display device converts the command into signals that are based on the first display device being a fire only display and that are based on the audio input. The disclosure also provides support for a method for operating a multi-media display, comprising: providing a command to different types of display devices on a network, converting the command at each of the display devices into signals according to display device type, and actuating the different types of display devices based on the signals. In a first example of the method, the command is provided in response to a display request received at a hub on the network. In a second example of the method, optionally including the first example, the different types of display devices include two or more of fire only devices, water devices, lighting devices, audio only devices, and combination fire and audio devices.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 1-7 are shown approximately to scale.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an entertainment system, comprising:
receiving user input at a central control hub communicatively coupled to multiple display devices, the user input including instructions for adjusting operating parameters of the multiple display devices of the entertainment system, the multiple display devices including at least one speaker, at least one fire device, at least one lighting device, and at least one water feature device;
converting the instructions into one or more signal transmission modes at the central control hub, the one or more signal transmission modes corresponding to communication modes of the multiple display devices; and
delivering the instructions to the multiple display devices from the central control hub via the communication modes of the multiple display devices to output a display at the multiple display devices, the display including visual and audio displays, based on the instructions, wherein adjusting the operating parameters of the multiple display devices includes adjusting the operating parameters to synchronize operation of the multiple display devices to an audio input, and wherein the audio input is music, and
wherein receiving the user input includes receiving the user input as instructions to assign the multiple display devices into different sub-groups, and wherein the multiple display devices are assigned to the sub-groups by one of user selection or automatic selection according to display device type.

2. The method of claim 1, wherein the audio input is one or more of an audio signal for the music received through an aux in port of the central control hub and an audio signal for the music received at the central control hub through a wireless communication link.

3. The method of claim 2, wherein adjusting the operating parameters to synchronize the operation of the multiple display devices includes one or more of varying a flame intensity of fire devices, a lighting effect of lighting devices, and a flow of water through water feature devices, according to audio effects of the audio input.

4. The method of claim 1, wherein receiving the user input at the central control hub includes receiving user input at a user interface of the central control hub, and wherein the user interface is configured to receive the user input via one or more of touch, sound, and gestures.

5. The method of claim 1, wherein converting the instructions into one or more signal transmission modes includes converting the instructions into hard-wired transmission modes and wireless transmission modes.

6. The method of claim 5, wherein delivering the instructions to the multiple display devices includes delivering the instructions via one or more of a communication cable, a local wireless network, a Bluetooth connection, and a radiofrequency channel.

7. The method of claim 1, wherein the sub-groups of the multiple display devices include a first sub-group comprising a first type of the multiple display devices and a second sub-group comprising a second type of the multiple display devices, wherein the first type of the multiple display devices are fire display devices, wherein the second type of display devices are water display devices, and wherein operation of the first sub-group and the second sub-group is controlled with synchronized operation to the music.

8. The method of claim 1, further comprising, prior to receiving the user input at the central control hub, detecting and identifying the multiple display devices, wherein detecting and identifying the multiple display devices includes transmitting querying signals to the multiple display devices and determining the multiple display devices are in an active mode and ready for operation based on the querying signals.

9. The method of claim 8, wherein detecting and identifying the multiple display devices includes determining a type of device for each of the multiple display devices.

10. An entertainment system, comprising:
a network, including;
multiple display devices, the multiple display devices including at least one speaker, at least one fire device, at least one lighting device, and at least one water feature device; and
a control hub communicatively coupled to the multiple display devices via one or more communication modes, the control hub configured to relay signals to coordinate operation of the multiple display devices in response to user input received at the control hub,
wherein the control hub is configured to receive an audio input and, in response to a request from a user to synchronize operation of the multiple display devices to the audio input, the control hub is further configured to relay instructions to the multiple display devices to coordinate adjustments to operating parameters of the multiple display devices to the audio input, and wherein the audio input is music, and
wherein receiving the user input includes receiving the user input as instructions to assign the multiple display devices into different sub-groups, and wherein the multiple display devices are assigned to the sub-groups by one of user selection or automatic selection according to display device type.

11. The entertainment system of claim 10, wherein the at least one fire device includes one or more of a fire pit and a fire torches.

12. The entertainment system of claim 10, wherein the control hub includes a user interface communicatively coupled to a base, and wherein the user interface is communicatively coupled to the base via one or more of a hard-wired connection and a wireless connection.

13. The entertainment system of claim 12, wherein the user interface is a tablet with a display screens and wherein the display screen is configured to receive the user input by one or more of touch, sound, and detection of movement.

14. The entertainment system of claim 13, wherein control parameters of the multiple display devices are displayed at the display screen and configured to be adjustable at the display screen by the user input.

15. The entertainment system of claim 10, wherein the audio input includes one or more of an audio signal received through an aux in port of the control, and an audio signal received through a wireless communication link between the control hub and another device.

* * * * *